United States Patent [19]
Cheney et al.

[11] Patent Number: 5,330,559
[45] Date of Patent: Jul. 19, 1994

[54] METHOD AND APPARATUS FOR ELECTROSTATICALLY CLEANING PARTICULATES FROM AIR

[75] Inventors: William A. Cheney; Wendell P. Spurgin, both of Cincinnati, Ohio

[73] Assignee: United Air Specialists, Inc., Cincinnati, Ohio

[21] Appl. No.: 928,274

[22] Filed: Aug. 11, 1992

[51] Int. Cl.$^5$ .......................... B03C 3/12; B03C 3/14
[52] U.S. Cl. .......................................... 95/63; 95/78; 96/55; 96/59; 96/66; 96/68; 96/77; 96/99
[58] Field of Search .................... 55/103, 6, 139, 124, 55/126, 131, 138, 155, DIG. 39, DIG. 38; 95/63, 68, 69, 70, 78; 96/17, 55, 57, 66, 68, 77, 80–82, 99, 98, 59

[56] References Cited

U.S. PATENT DOCUMENTS

| | | | |
|---|---|---|---|
| 2,085,735 | 7/1937 | Brion et al. | 96/75 |
| 2,612,966 | 10/1952 | Nicol | 55/103 |
| 2,814,355 | 11/1957 | Powers | 55/132 |
| 2,991,843 | 7/1961 | Bell | 55/482 |
| 3,053,028 | 9/1962 | Kayko | 55/103 |
| 3,073,094 | 1/1963 | Landgraf et al. | 55/131 |
| 3,105,750 | 10/1963 | Kayko et al. | 55/103 |
| 3,191,362 | 6/1965 | Bourgeois | 96/57 |
| 3,487,610 | 1/1970 | Brown et al. | 55/279 X |
| 3,520,110 | 7/1970 | Knauer | 55/485 X |
| 3,680,287 | 8/1972 | Wood, III et al. | 55/524 |
| 3,763,633 | 10/1973 | Soltis | 55/126 |
| 3,798,879 | 3/1974 | Schmidt-Burbach et al. | 55/302 X |
| 3,800,509 | 4/1974 | Carr et al. | 55/131 |
| 3,828,526 | 8/1974 | King | 55/DIG. 38 |
| 3,910,779 | 10/1975 | Penney | 55/124 |
| 3,988,131 | 10/1976 | Kanazawa et al. | 96/58 |

(List continued on next page.)

FOREIGN PATENT DOCUMENTS

| | | |
|---|---|---|
| 607756 | 11/1960 | Canada. |
| 1272453 | 8/1990 | Canada. |
| 1350576 | 12/1963 | France. |
| 2232908 | 1/1991 | United Kingdom. |

OTHER PUBLICATIONS

Hawley, G. G., *The Condensed Chemical Dictionary;* 8th Edition; Reinhold Publishing Co.; 1971; pp. 290, 291, 779, 784.

Catalog for Dust-Hog TM Dust Collecting Systems ©1991, United Air Specialists, Inc.

*Primary Examiner*—Richard L. Chiesa
*Attorney, Agent, or Firm*—Frost & Jacobs

[57] ABSTRACT

An electrostatic air cleaner is disclosed along with a method for removing particulate matter from moving streams of air. A high voltage ionizer is used as a corona source to ionize the particulate matter as it approaches the air filter portion of the electrostatic air cleaner. The air filter uses a pair of reticulated polyether foam filters for collecting the particulate matter. The foam filters are separated by a thin, grid-like layer of semiconductive material (carbon-impregnated polycarbonate) which is raised to a very high DC voltage. The foam filters are also surrounded by thin, grid-like layers of electrically conductive material which are held at ground potential, thus creating a high-voltage electric field through each of the foam filters. The polyether foam filter media is non-deliquescent, thus preventing the high-voltage electric field from being dissipated by such imbedded water vapor, which is the cause of filter inefficiency in the prior art. The electrostatic air cleaner of the present invention has such high initial efficiency that it does not require the addition of any particulate matter to its surfaces to achieve its nominal efficiency when first put into use. The air filter can be constructed in a relatively thin, rectangular shape, or in a cylindrical cartridge for use with industrial dust collecting systems. Both shapes lend themselves for ease of installation and removal within air handling systems.

39 Claims, 16 Drawing Sheets

U.S. PATENT DOCUMENTS

| | | | |
|---|---|---|---|
| 4,026,684 | 5/1977 | Finger | 55/126 |
| 4,115,092 | 9/1978 | Newell | 55/103 |
| 4,119,415 | 10/1978 | Hayashi et al. | 96/60 |
| 4,133,653 | 1/1979 | Soltis | 55/126 |
| 4,185,972 | 1/1980 | Nitta et al. | 55/155 |
| 4,205,969 | 6/1980 | Matsumoto | 55/131 |
| 4,229,187 | 10/1980 | Stockford et al. | 55/14 |
| 4,231,766 | 11/1980 | Spurgin | 361/230 X |
| 4,354,858 | 10/1982 | Kumar et al. | 55/6 |
| 4,357,151 | 11/1982 | Helfritch et al. | 55/6 |
| 4,419,107 | 12/1983 | Roydhouse | 55/446 X |
| 4,473,382 | 9/1984 | Cheslock | 55/126 |
| 4,541,847 | 9/1985 | Oie et al. | 55/124 |
| 4,549,887 | 10/1985 | Joannou | 55/131 |
| 4,662,903 | 5/1987 | Yanagawa | 55/126 |
| 4,759,778 | 7/1988 | Conrad | 55/131 |
| 4,781,736 | 11/1988 | Cheney et al. | 55/132 |
| 4,902,306 | 2/1990 | Burnett et al. | 55/6 |
| 4,938,786 | 7/1990 | Tonomoto | 55/524 X |
| 4,940,470 | 7/1990 | Jaisinghani et al. | 55/2 |
| 4,944,778 | 7/1990 | Yanagawa | 55/131 |
| 4,978,372 | 12/1990 | Pick | 55/132 |
| 5,037,455 | 8/1991 | Scheineson et al. | 55/103 |

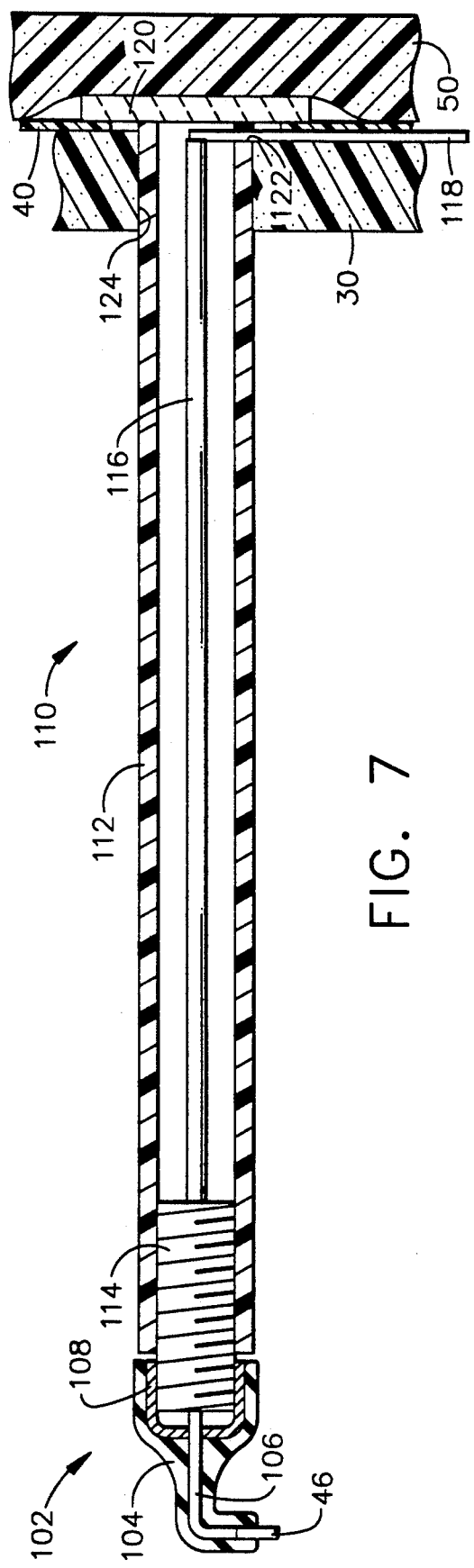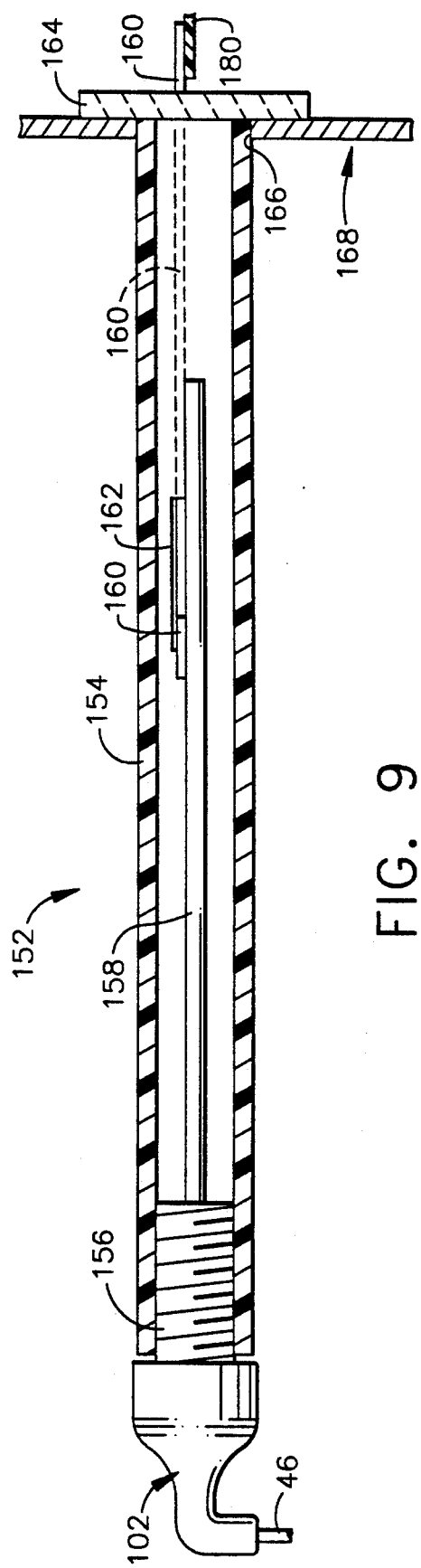

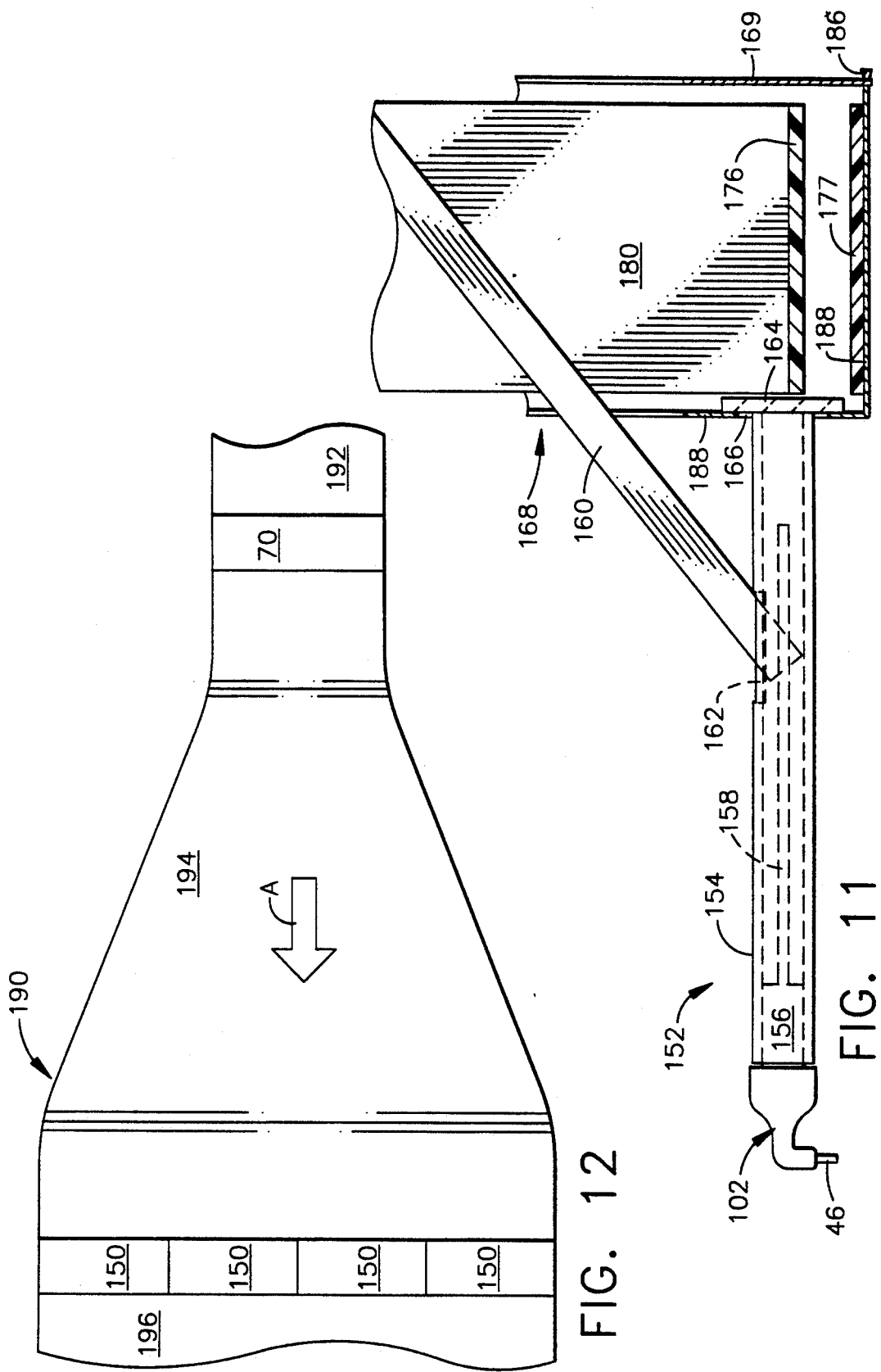

METHOD AND APPARATUS FOR ELECTROSTATICALLY CLEANING PARTICULATES FROM AIR

TECHNICAL FIELD

The present invention relates generally to electrostatic air cleaning equipment and is particularly directed to air cleaners of the type which use a high voltage source to ionize incoming airborne particulates, and a reticulated foam filter media for collecting such ionized particulates. The invention will be specifically disclosed in connection with a positive D.C. voltage source used as an ionizer of the air to be filtered, a grounded support grid and frame to maintain the integrity of the structure, a pair of reticulated foam filters for collecting the particulates from the air, and a center grid made of semi-conductive material which is also maintained at a positive high D.C. voltage level. Using an alternate construction, the invention also will be disclosed in connection with a cylindrical cartridge-type filter which uses a positive D.C. voltage source to ionize the air to be filtered, a grounded, perforated outer structure and a perforated inner structure that also is grounded, a pair of cylindrical reticulated foam filters for collecting particulate matter, and a cylindrical grid of semiconductive material which is maintained at a positive high D.C. voltage level.

BACKGROUND OF THE INVENTION

Electrostatic air filters have been known in the art for many years. Some of the earliest electrostatic air filters have configurations in which the filtering media accumulates a charge by virtue of air passing through that media. One such apparatus which develops an electrostatic charge from moving air used a mat made of filaments or fibers of polyethylene (See U.S. Pat. No. 2,612,966). A similar device is taught by U.S. Pat. No. 4,229,187, wherein a polymeric material becomes self-charged in the presence of moving air, using such preferred materials as polyester, nylon, and polypropylene.

Because the efficiency of self charging filters is low, the majority of electrostatic air filters use some type of high-voltage source electrically connected to the filter media, and/or a similar high-voltage source electrically connected to an electrode which is used to ionize particles in the air that are then collected by a filter media. One early such electrostatic air filter uses wires or rods to impart a charge on a paper filter element, preferably using a paper having a high rayon content (See, U.S. Pat. No. 2,814,355). Another design discloses the use of filter batts made of metallic and dielectric filamentary materials, such as DYNEL TM and fine aluminum filaments, wherein the electrical charge is transferred to the filter batt by direct electrical connection to a high-voltage source (See, U.S. Pat. No. 3,053,028). A further configuration using filter batts teaches the use of any suitable medium, such as glass fibers, which is capable of being electrostatically charged to attract and hold particles (See, U.S. Pat. No. 3,105,750).

Other configurations of electrostatically-charged filters have been taught in the prior art, including an electrostatic filter panel made of a charged cotton mesh pad having a conductive coating (See, U.S. Pat. No. 3,073,094). Another design using a dielectric filter material such as a polyester media is taught in U.S. Pat. No. 3,763,633. This reference also teaches a wire screen grid sandwiched between two open cell polyurethane foam filters, and additionally teaches that as the filter cell becomes dirtier, it also becomes more efficient in removing particulates. Another design teaching the use of open cell foam polyurethane as the filtering media is set forth in U.S. Pat. No. 4,115,082.

A further configuration of electrostatic air filters is taught in U.S. Pat. No. 3,910,779, in which the filter is in a bag configuration made of cloth or other textile fabric. A yet further configuration of electrostatic air filters is taught in U.S. Pat. No. 4,185,972, in which an electret filter media contains a built-in charge. In the preferred embodiment of this reference, the filter consists of polypropylene fibers coated with a metallic coating. Another electrostatic air filter design, set forth in U.S. Pat. No. 4,781,736, discloses the use of non-conductive fibrous filter sheets made of fiberglass, which are incorporated within an electric field formed between spacers. The charge is induced on the filter elements by electrodes, rather than by action of charged particles themselves. Another design, disclosed in U.S. Pat. No. 4,978,372, has a pleated charged media consisting of a fibrous filter pad which is disposed between adjacent pairs of charging media. The preferred embodiment of this reference discloses a pad made of fiberglass. However, other dielectric fibers such as polyester and blends of polyester and cotton can also be used.

A further electrostatic air filter design in disclosed in Canadian Patent No. 1,272,453). This Canadian patent provides a disposable rectangular "cartridge" which is connected to a high voltage power supply. The "cartridge" consists of a conductive inner screen which is sandwiched by two layers of a dielectric "fibrous material" (either plastic or glass), which, in turn, is further sandwiched by two outer screen layers of conductive material. The conductive inner screen is raised to a high voltage via an electrical connection to the high voltage power supply, thereby imparting an electrostatic field across the two dielectric layers.

A major failing of the prior art is that the foam or fibrous filter materials disclosed in the past tended to pick up moisture from humid air traveling therethrough. When the foam or fibrous media accumulated such moisture, the electrostatic charge (i.e., the electric field) tended to be dissipated through the moist media, thus gradually making the electrostatic filters ineffective. Because the water vapor in the atmosphere eventually is absorbed in the charged media used in existing electrostatic air filters, the prior art has not disclosed a method or apparatus which can properly work in humid environments.

Another failing of the prior art has been the inability to achieve good efficiency at velocities that are economically practical for most applications.

Cartridge-type filters, which are cylindrically-shaped air filters that have "dirty" air directed through an outer layer of filter media and have "clean" air directed out of the center of the cylinder, are typically used in dust collecting systems. A further failing of the prior art, particularly in the use of such cartridge-type filters, is that the media used in the filter does not achieve its nominal efficiency (a later, higher efficiency than its initial efficiency) until after a certain coating of particulates has been accumulated. In applications like filtration of inlet air to gas turbines used to generate electricity, the cartridge filter will operate for weeks at low efficiency for small particle size removal. In fact, many manufacturers of cartridge filters use limestone dust or some other substance to coat such filters in order to achieve their nominal efficiency at the time the filters are first used. A disadvantage of this coating process is that the "new" filter is already partially used up, and therefore, is deprived of a certain amount of its useful lifetime before it becomes completely clogged due to its increased differential pressure drop as air moves across.

SUMMARY OF THE INVENTION

Accordingly, it is a primary object of the present invention to provide an electrostatic air cleaner which achieves its nominal efficiency immediately and without the use of some artificial agent to coat the filter before its initial use.

It is another object of the present invention to provide an electrostatic air cleaner which does not absorb water vapor from the air stream passing through the filter, and therefore, does not reduce the electric field which is primarily important in maintaining the nominal efficiency of the filter.

It is a further object of the present invention to provide an electrostatic air filter having an open cell foam media which can accumulate particulate from the air flow and significantly decrease its rate of build up of differential pressure drop across that filter media. The open cell pores of the media still allow air to pass through the filter media, while at the same time accumulating and retaining the particulates.

It is a yet further object of the present invention to provide an electrostatic air cleaner which maintains its efficiency at a reduced rate of pressure buildup as particulate accumulates on the face of the filter in the form of strands, also called dendrites.

It is yet another object of the present invention to provide an electrostatic air cleaner which includes a grid made of a material having high volume resistivity which can transmit a high voltage at its surfaces, yet will not arc while maintaining that high voltage state.

It is still a further object of the present invention to provide an electrostatic air cleaner which uses layers of open cell foam media to filter and collect particulate from the air, and uses layers of a material having high volume resistivity which can transmit a high voltage at its surfaces, yet will not permit formation of an arc while maintaining that high voltage state. The plane of the layers is parallel to the direction of air flow through the air cleaner.

Another object of the present invention is to provide a cylindrically-shaped cartridge-type electrostatic air cleaner which can be used in industrial dust collecting systems. The cartridge-type air cleaner employs cylindrical layers of open cell foam media to filter and collect particulate from the air, and a cylindrical layer of a material having high volume resistivity which can transmit a high voltage at its surfaces, yet will not arc while maintaining that high voltage state.

Yet another object of the present invention is to provide a cartridge filter that controls the air flow therethrough so that there is a substantially uniform air flow rate over the entire cross-sectional area of the inlet of the cartridge filter, thereby preventing the high-pressure areas at the inlet from otherwise pushing a disproportionate amount of air through a small portion of the filter media, which would cause a lowering in efficiency.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved electrostatic air cleaner is provided which uses as the air cleaner's filter media an open cell foam material that is non-deliquescent. This non-deliquescence allows the filter media to accumulate particulates from the air flowing through the filter media without retaining and accumulating water vapor from that air flow. The air cleaner can be provided with an ionization electrode to improve efficiency. The electrode is located at a distance upstream of the inlet side of the air cleaner's main portion. The main portion of the air cleaner includes a conductive layer of material shaped in the form of a grid at its inlet side, a layer of open cell foam material, which is the non-deliquescent material, a thin layer of grid-shaped material made of an electrically semiconductive material, a second layer of the non-deliquescent open cell foam material, and finally a conductive material in the form of a grid (which could consist of hardware cloth) on its outlet side. The semiconductive grid material between the foam material layers is connected to a high-voltage positive DC power source, which causes an electric field to be created through both of the open cell foam pieces, which have a layer of conductive material on their opposite sides that are both fixed at ground potential. The ionizing electrode, if used, is also charged to a high positive DC voltage, and acts as a corona source to positively charge the particulate matter of the air flow as it approaches the inlet side of the air cleaner's main portion. It will be understood that negative D.C. voltage would also work well in this invention, but would probably require ozone control devices somewhere downstream for applications where ozone production is objectionable.

Using an alternate method of construction, the layer of hardware cloth on the outlet side of the main portion of the air cleaner can be replaced with a stamped support frame which is perforated. The perforations can be in the form of an X-Y grid of squares or rectangles, in the form of circles, or some other shape. The stamped support frame would be less expensive to manufacture and assemble than a support frame assembly which used hardware cloth, and the overall operation of the electrostatic air cleaning apparatus would not be affected.

Another alternate method of construction can be used in accordance with the purposes of the present invention to provide an improved electrostatic air cleaner which uses several parallel "sandwich"-like layers stacked upon each other, each consisting of a thin electrically conductive plate, a layer of open cell non-deliquescent foam material, a thin electrically semiconductive sheet, and a second layer of the non-deliquescent open cell foam material. The end-most "sandwich"-like layer is placed adjacent to another thin electrically conductive plate. These "sandwich"-like layers are arranged so as to be parallel to the direction of air flow through the air cleaner, and the solid plates can be manufactured at a lower cost than the grid patterns used for conductive and semiconductive layers of material in the other embodiments of the present invention. Each semiconductive sheet is connected to a high-voltage positive DC power source, which causes an electric field to be created through both of the open cell foam layers of each "sandwich." The ionizing electrode, if used, is also charged to a high positive DC voltage, and acts as a corona source to positively charge the particulate matter of the air flow as it approaches the inlet side of the air cleaner's main portion.

A further alternate method of construction in accordance with the purposes of the present invention is to provide an improved electrostatic air cleaner which is cylindrical is shape, and can be used as a "cartridge"-type filter in industrial dust collecting systems. The cartridge includes a cylindrically-shaped conductive layer of hardware cloth, expanded metal, or perforated material at its outer (inlet) surface, a hollow cylinder of open cell foam (which is non-deliquescent) mounted just inside the outer conductive layer of material, a cylindrically-shaped layer of grid-shaped material made of an electrically semiconductive material mounted further to the inside, a second layer of the open cell non-deliquescent foam material mounted still further to the inside, and an inner cylindrically-shaped conductive layer of material which is at the outlet of the cartridge. The inner conductive layer of material can consist of hardware cloth, expanded metal, perforated metal, or a grid-shaped metallic structure having enough strength to support the overall cartridge against the high pressure of the inlet air entering the cartridge. The middle, semiconductive grid material is connected to a high-voltage positive DC power source, which causes an electric field to be created through both of the open cell foam pieces. The ionizing electrode, if used, is also charged to a high positive DC voltage, and acts as a corona source to positively charge the particulate matter of the air flow as it approaches the inlet side of the cartridge.

Another alternate method of construction for cartridge filters built in accordance with the purposes of the present invention is to provide variable opening sizes in certain layers of the cartridge filter which control the air flow into the cartridge filter so that a substantially uniform flow rate occurs through each portion of the entire cross-sectional area of the inlet of the cartridge filter. This is necessary to achieve maximum efficiency since the inlet of one end of the cartridge filter (the open end) experiences much higher air pressure than the other (closed) end. As an example, the outer layer of conductive material can have larger openings at the low pressure area, and much smaller openings at the high pressure area, thereby creating a high-pressure drop path for air attempting to enter the inlet at the high pressure area. Alternatively, the inner layer of conductive material could, similarly, have larger openings at the low pressure area and much smaller openings at the high pressure area of the cartridge filter's inlet. A further similar alternative could arrange for variable hole sizes in the semiconductive layer, such that holes gradually become smaller from the low pressure end toward the high pressure end.

Yet another alternate method of construction for cartridge filters built in accordance with the purposes of the present invention is to provide a layer of filter media having a variable thickness, thereby controlling the air flow into the cartridge filter so that a substantially uniform flow rate occurs through each portion of the entire cross-sectional area of the inlet of the cartridge filter. The layer of filter media would have its minimum thickness at the low pressure end of the cartridge filter, and would gradually become greater in thickness until its maximum thickness was achieved at the high pressure end. The greater thickness of filter media would create a greater pressure drop due to friction losses as air travelled through, thereby causing a more uniform overall air flow through the filter media (and a greater overall filter efficiency).

The air cleaner of the present invention does not appreciably absorb water vapor, and therefore, retains its high-voltage electric field gradient across the two foam layers of the filter media. The air cleaner of the present invention also has a nominal efficiency which does not require the addition of a coating of particulate material of any type in order to achieve that nominal efficiency as it is first being used. The air cleaner of the present invention maintains an essentially constant efficiency as it accumulates particulate on the filter media within the useful life of the filter. Due to the open cell structure of the foam media and the charged particles in the electric field, the air cleaner of the present invention exhibits a very slow increase in its differential pressure drop as air is flowing through it while at the same time retaining particulate matter in that open cell foam media.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification illustrates several aspects of the present invention, and together with the description serves to explain the principles of the invention. In the drawing:

FIG. 7 is a fragmentary cross-sectional view of the details of the electrode assembly used in the air filter of FIG. 5.

FIG. 9 is a fragmentary longitudinal cross-sectional view of the details of the electrode assembly used in the air filter of FIG. 8.

FIG. 11 is a fragmentary top plan view, partly in cross-section, of the details of the electrode assembly and its mating connection into the electrostatic air filter of FIG. 8.

FIG. 12 is a fragmentary plan view of a bank of electrostatic air filters of the type depicted in FIG. 8, which use one common inlet plenum and share one common ionizer.

DETAILED DESCRIPTION OF THE PREFERRED EMBODIMENT

Reference will now be made in detail to several embodiments of the present invention, examples of which are illustrated in the accompanying drawing, wherein like numerals indicate the same elements throughout the views.

Figure 1:
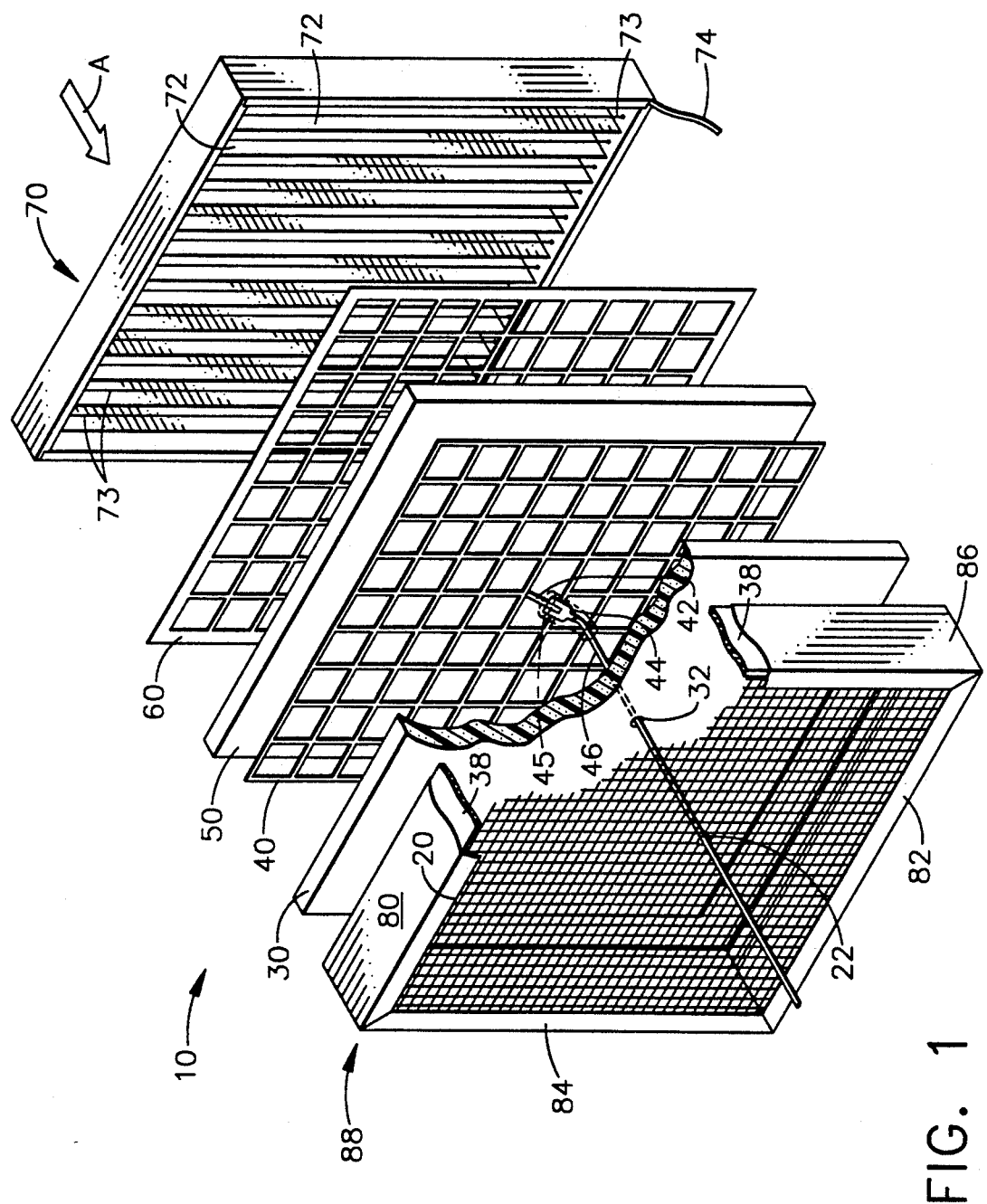
FIG. 1 is a fragmentary exploded perspective view of an electrostatic air filter constructed in accordance with the principles of the present invention, including the associated ionizer.

Referring now to the drawing, FIG. 1 depicts the air cleaner of the present invention in a perspective view which is exploded so as to more easily understand the various layers of this air cleaner, which is generally designated by the numeral 10. A hardware cloth support grill 20, preferably made of $\frac{1}{4}''$ hardware cloth, is located at the outlet side of air cleaner 10. Hardware cloth support grill 20 is preferably fixed at ground potential by means which will be described in greater detail below. This support grill provides both mechanical support for the air cleaner 10, and also, due to its being fixed at ground potential, creates a voltage gradient across certain other portions of the air cleaner.

There is a small hole 22 near the center of the hardware cloth support grill 20 in order for a wire 46 to be run through the support grill 20. Adjacent to hardware cloth support grill 20 is a layer of filter media 30, which is preferably made of reticulated polyether foam, having a cell structure in the range of 20–90 pores per inch (ppi). Such foam, known as "SCOTTFOAM TM", can be obtained from one of two manufacturers, FOAMEX, located at 1500 East Second Street, Eddystone, Pa., and Crest-Foam Corporation, located at 108 Carol Place, Moonachie, N.J. Reticulated polyether foam is non-deliquescent, meaning that it does not appreciably absorb water vapor from air as it is passed through the foam. The reticulated polyether foam has an open cell structure, which allows particulates to be collected on the surface of the foam in the form of its dendrites and within the open pores. The reticulated polyether foam used in the filter media 30 has a very high volume resistivity, on the order of $10^{12}$ ohm-centimeters, which allows a very strong electric field to be placed across the layer of foam. The open cell structure of filter media 30 preferably has a porosity in the range of 20–90 ppi. A small hole 32 is located near the center of the outlet filter media 30 so that electric wire 46 can pass through. An insulating shroud 45 covers the high voltage connection to prevent corona and arcing from the connection.

A thin layer of semiconductive material 40, which is shaped in the form of a grid, is located on the opposite side of the filter media 30 from hardware cloth support grill 20. As can be seen in FIG. 1, semiconductive grid 40 is shaped so that it has large open areas in order to allow the majority of air flow to pass through it without being deflected by the grid itself. It will be understood that various grid pattern shapes for semiconductive grid 40, other than the illustrated X-Y shape of the grid pattern depicted in FIG. 1, may be used with equally good results. The material used to form the semiconductive grid 40 is preferably carbon-impregnated polycarbonate having a volume resistivity in the range of $10^7$ to $10^{10}$ ohm-centimeters. Such carbon-impregnated polycarbonate material can be obtained from one of two manufacturers, LNP Engineering Plastics, located at 475 Creamery Way, Exton, Pa., and AKZO Engineering Plastics, located in Evansville, Ind. It will be understood that other materials having a volume resistivity that falls within the same range of $10^7$ to $10^{10}$ ohm-centimeters could be suitable for use as the semiconductive grid.

Figure 3:
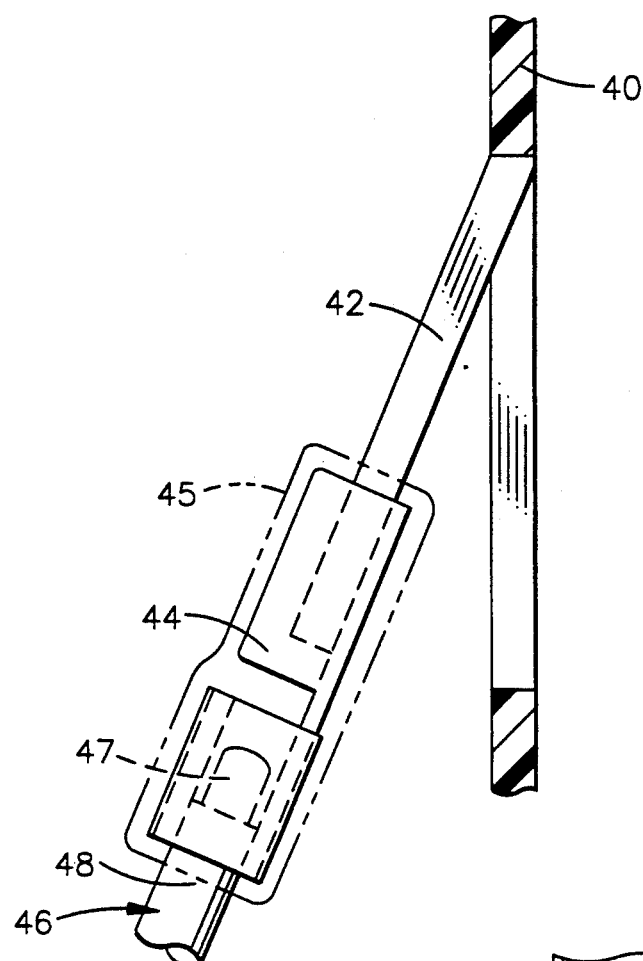
FIG. 3 is an enlarged fragmentary side elevation view of the center portion of the semiconductive grid of the electrostatic air filter of FIG. 1, including the leg of the semiconductive grid which is attached to the slip-on electrical connector.
Figure 4:
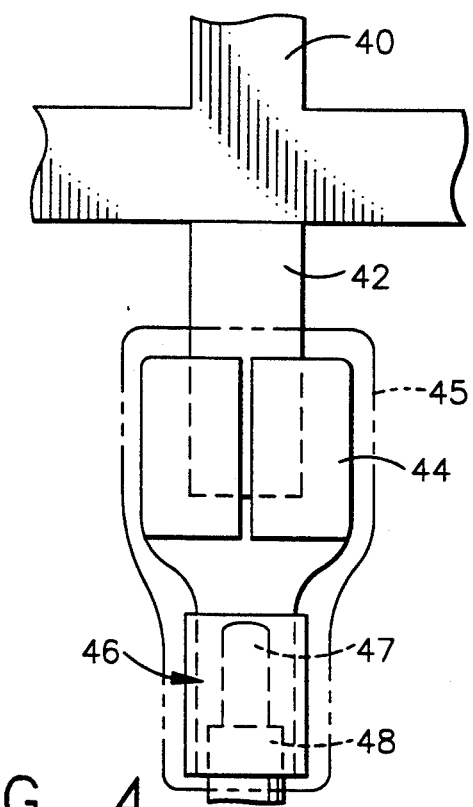
FIG. 4 is an enlarged fragmentary front elevation view of the center portion of the semiconductive grid of the electrostatic air filter of FIG. 1, including the leg of the semiconductive grid which is attached to the slip-on electrical connector.

At a location near the center of the semiconductive grid 40 is a rib 42 which is part of the grid 40 and which can be bent away from the rest of the plane of semiconductive grid 40. The rib 42 has a slip-on electrical connector 44 attached to it, which is, in turn, attached to the electrical wire 46. The details of the electrical connector 44, the broken-away rib 42, and the electrical conductor 47 and insulation 48 of electric wire 46 are best viewed in FIGS. 3 and 4. Electrical wire 46 is directly connected to a high-voltage DC source, preferably in the range of 12 to 45 kilovolts. The high-voltage DC source (not shown) is preferably current-limited. By virtue of the high voltage source connected directly to semiconductive grid 40, there is a very high electric field gradient produced across outlet filter media 30 (which is maintained at ground potential on its opposite side). An insulative shroud (a slip-on cover) 45 surrounds the electrical connector 44 to prevent corona and arcing from the connector 44.

It will be understood that electrical wire 46 could be connected to a negative polarity high-voltage DC source (preferably in the range of −12 to −45 kilovolts), which is also preferably current-limited. With this configuration, a very high negative electric field gradient is produced across outlet filter media 30 (which is maintained at ground potential on its opposite side). Since the ionizer 70 has imparted a positive charge onto the moving air particulates, such particulates would tend to be directly attracted to the negatively charged outlet filter media 30.

A second layer of filter media 50 is placed on the opposite side of semiconductive grid 40 from the outlet filter media 30. Inlet filter media 50 is made of the same reticulated polyether foam as outlet material media 30, and it is also in the same size and shape as outlet filter media 30. There is no hole however, near the center of the inlet filter media 50. The porosity of the inlet filter media 50 can differ from that of the outlet filter media 30.

Continuing further toward the inlet side of the electrostatic air cleaning apparatus 10 is another grid 60 of material which is preferably made of carbon impregnated polycarbonate in a more conductive form than the semiconductive grid 40, preferably having a volume resistivity less than $10^5$ ohm-centimeters. It will be understood that other materials having a volume resistivity that falls within the same range of less than $10^5$ ohm-centimeters could be suitable for use as the conductive grid 60. This more "conductive" grid 60 is fixed at ground potential by means which will be discussed in more detail below. Conductive grid 60 is of the same approximate size and shape as the semiconductive grid 40, however, semiconductive grid 40 is slightly smaller in its overall height and width. The thickness of semiconductive grid 40 is approximately the same as the thickness of conductive grid 60. It will be understood that various grid pattern shapes for conductive grid 60 may be used, other than the illustrated X-Y shape of the grid pattern depicted in FIG. 1, with equally good results.

Conductive grid 60 can be made of a metallic substance, and could consist, for example, of hardware cloth or a fine mesh screen. Alternatively, both support grid 20 and conductive grid 60 can have the same shape, and can be made of identical materials. Such materials can include metal, a conductive plastic such as carbon impregnated polycarbonate, or some other type of conductive material.

Figure 2:
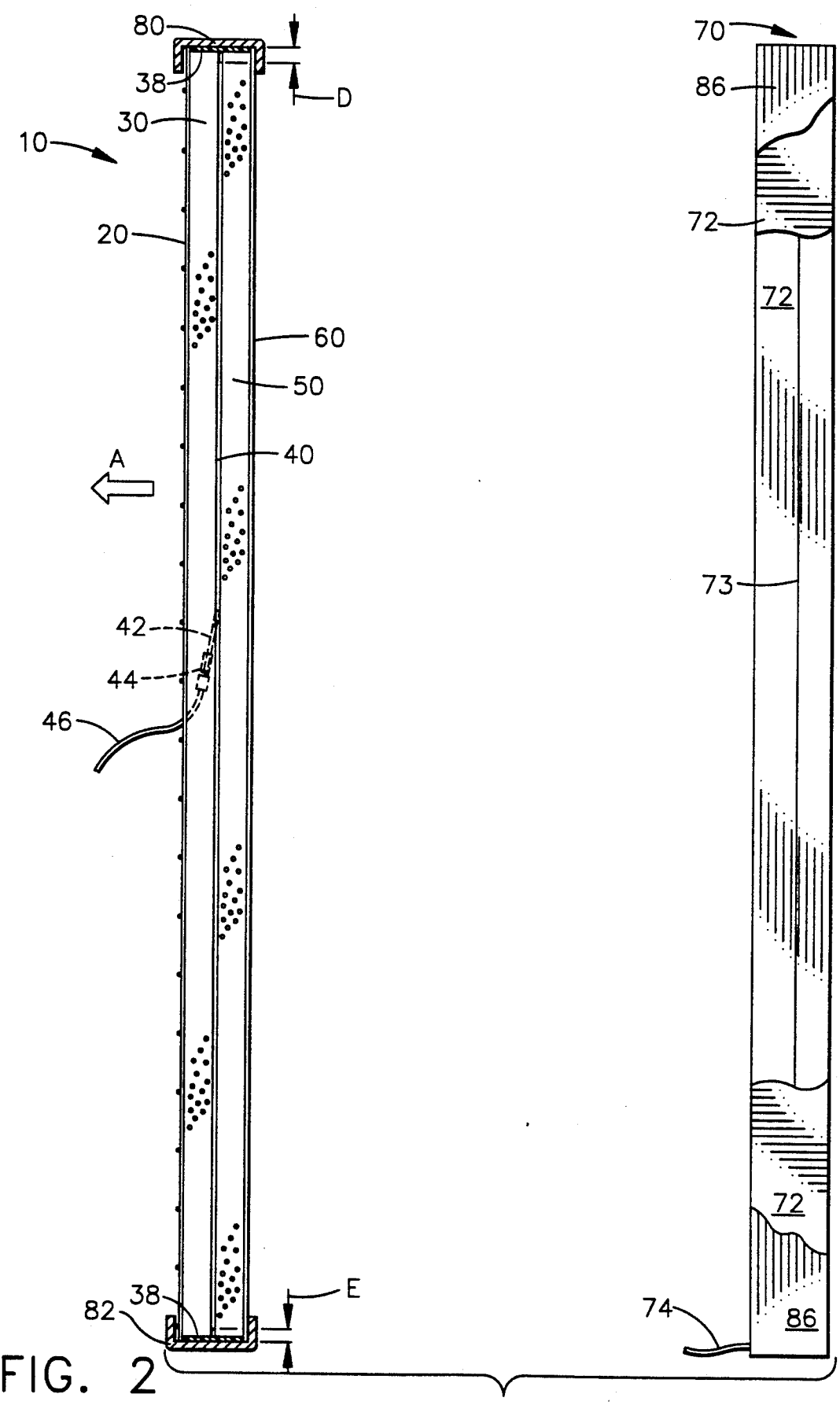
FIG. 2 is a partially cut-away side elevation view of the electrostatic air filter of FIG. 1, including the ionizer.

It should be noted that the electric wire 46 could alternatively be run through conductive grid 60 and inlet filter media 50, rather than through hardware cloth support grill 20 and outlet filter media 30, as illustrated in FIGS. 1 and 2. This alternative configuration could have advantages in applications involving various equipment arrangements.

Ionizer 70 can be placed up-stream of the inlet side of electrostatic air cleaning apparatus 10 to improve efficiency of the filtering system. Ionizer 70 includes a number of ground plates 72 and high-voltage electrodes 73, mounted between each of the ground plates. The electrodes 73 are connected to an electrical wire 74. An ionizer of this type is well known in the prior art. Ionizer 70 can be placed at various distances from the conductive grid 60. However, its most efficient use is where its location is farther from conductive grid 60 than the distance from electrodes 73 to their nearest grounding point. Ionizer 70 is preferably charged to a positive DC voltage in the range of 6–20 kilovolts. This is accomplished by connecting the electrodes 73 of ionizer 70, by means of wire 74, to a current-limited high-voltage DC power source (not shown). The use of a positive voltage at this point reduces the formation of ozone in the air stream being passed through the air cleaning apparatus 10. As seen in FIG. 2, the direction of the air stream is given by the arrow denominated by the letter "A".

A support frame assembly 88, preferably made of conductive material, is placed around the outer edges of the assembled electrostatic air cleaning apparatus 10. Portions of the top and bottom support frames 80 and 82, respectively, are depicted in FIGS. 1 and 2. Other portions of the support frame, designated by the numerals 84 and 86, are partially shown in FIG. 1. In an alternative embodiment, the support frame assembly 88 can be made of insulative material, in which case a separate grounding wire would be required for attachment to the hardware cloth support grill 20 and the conductive grid 60.

A layer of insulative material 38 is located adjacent to the inner surface of all the support frame portions 80, 82, 84, and 86, so that leakage current between semiconductive layer 40 and the support frame assembly 88 is held to a minimum. The material used for insulative layer 38 is preferably DELRIN ™.

As can be seen in FIG. 2, the semiconductive grid 40 does not have the same height dimension as the conductive grid 60 and as the hardware cloth support grill 20. The hardware cloth support grill 20 and the conductive grid 60 both have heights which allow the respective pieces to extend from the bottom support frame 82 all the way to the top support frame 80, as viewed in FIG. 2. In this manner, if the electrostatic air cleaning apparatus 10 is placed into a metal air ducting system, or an air ducting system made of some other type of conductive material, then support frame assembly 88 is automatically grounded by that air ducting system. In the configuration of FIG. 2, this also automatically grounds the hardware cloth support grill 20 and the conductive grid 60, without the need of a further electrical conductor which would extend to a distant grounding point. If, on the other hand, the air ducting system was not made of a conductive material, then a grounding conductor (not shown) would be required to be attached to a portion of the support frame assembly 88 (at 80, 82, 84, or 86), so that both the hardware cloth support grill 20 and the conductive grid 60 would also be maintained at ground potential.

The semiconductive grid 40 does not extend all the way to the top support frame 80 or the bottom support frame 82, nor does it extend all the way across the width to side support frames 84 or 86. In order for the semiconductive grid 40 to be charged to a positive high DC voltage, preferably in the range of 12–45 Kv, it cannot be allowed to touch any of the grounded components, such as the support frames 80, 82, 84, or 86. Therefore, in the illustrated embodiment of FIG. 2, there is approximately a ⅜" gap, denoted by dimension D, between the edge of the semiconductive grid 40 and the top support frame 80, and there is a second ⅜" gap, denoted by the letter E, which exists between the semiconductive grid 40 and the bottom support frame 82. The insulative layer 38 is located within the above ⅜" gap surrounding semiconductive layer 40.

Even with this small ⅜" air gap, which is partially closed by reticulated polyether foam, there is only about ten microAmperes of leakage current which flows from semiconductive grid 40 to ground. This very small leakage current value can be attributed to the very high volume resistivity of the reticulated polyether foam used in the filter media 30 and 50. Since this material is non-deliquescent, as noted above, and does not absorb water vapor, this low leakage current will continue throughout most of the life of the electrostatic air cleaning apparatus 10 of the present invention when used in all applications except those involving conductive contaminants. The low leakage current is one of the keys to the successful operating of an electrostatic air cleaner of the type of the present invention, because it connotes the fact that the high-voltage DC electric field is not being degraded by the accumulation of water vapor.

By being able to bring the electrical charging grid (semiconductive grid 40) in close proximity to the support frames 80, 82, 84, and 86 (which are lined with the insulative layer 38), an intense electric field can be created all the way to the edge of the media portions 30 and 50 to virtually eliminate low efficiency bypass in the media. Maintaining the high-voltage DC electric field across the two filter media portions 30 and 50 allows the air cleaner of the present invention to maintain its high efficiency throughout its useful life, which is a greatly extended useful life as compared to filters of the prior art. In addition, by use of the polyether foam materials of filter media portions 30 and 50, the intense electric field can exist across the filter media without risk of arcing, thus preventing a safety hazard, and a further potential loss of efficiency.

The use of the carbon-impregnated polycarbonate material of semiconductive grid 40 further permits the close proximity of the electrical charging grid (semiconductive grid 40) to the grounded surfaces of support frames 80, 82, 84, and 86 without risk of arcing. This material allows the use of very high gradient electric fields in such physical areas, with an attendant improvement in efficiency, as noted above, due to the virtual elimination of low efficiency bypass in the media or in any air gaps between the electrical charging grid and any grounded surfaces.

The electrostatic air cleaner apparatus 10, having reticulated polyether foam material as its filter media 30 and 50 of a porosity in the range of 20-90 ppi, works quite well in the range of air velocities of up to 350 feet per minute (FPM). The ionizer 70, located at some distance from the inlet side of the rest of the filter apparatus 10, works well in excess of 1,000 FPM air velocity. The ionizer 70 can, therefore, be used with a number of banks of electrostatic air cleaning apparatus 10 of the present invention. Such an ionizer can be used with a minimum of three banks of the electrostatic air cleaning apparatus 10, but could also be used with as many as six banks depending on how low an air velocity is desired in a particular installation.

Figure 5:
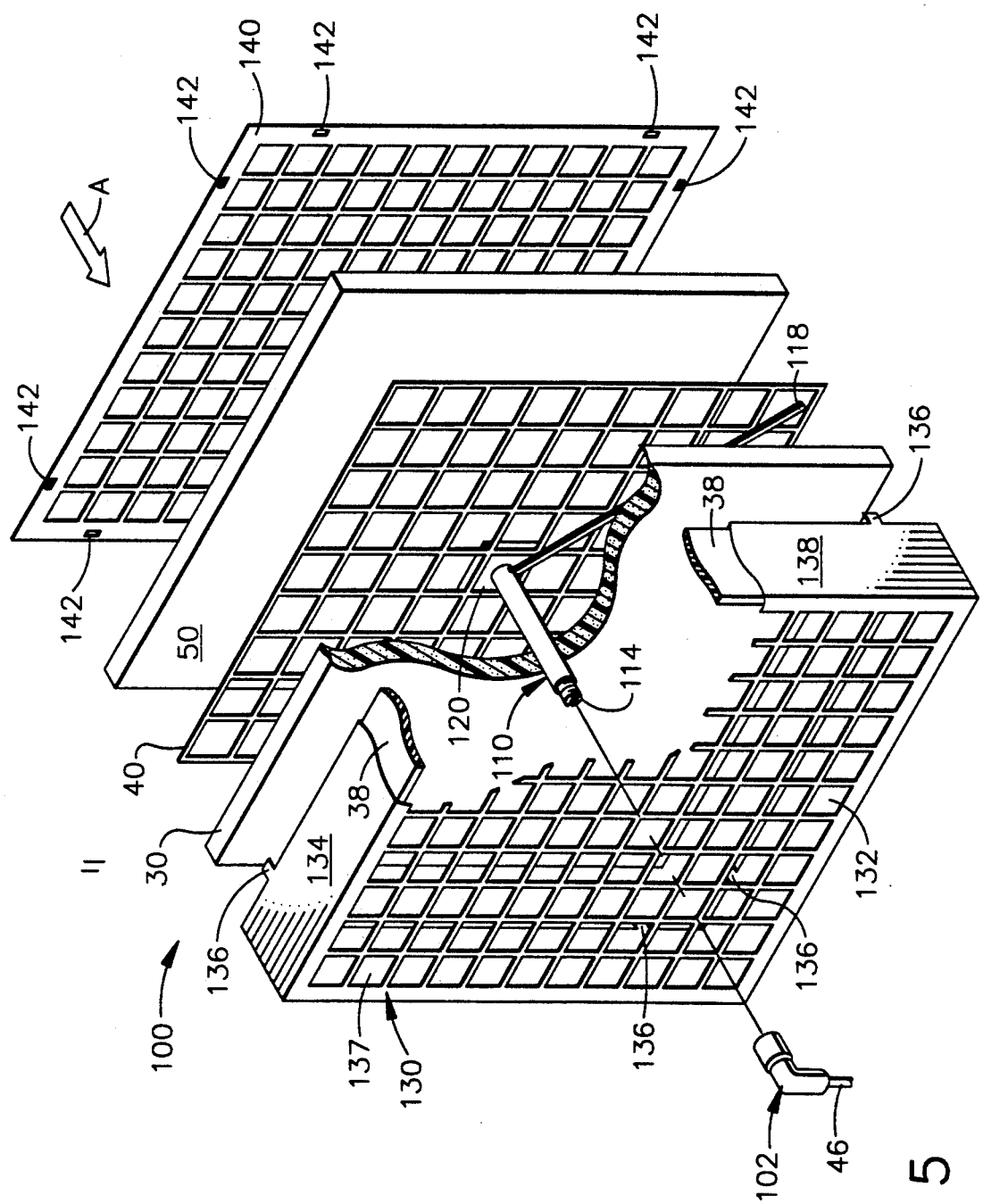
FIG. 5 is a fragmentary exploded perspective view of an electrostatic air filter similar to that of FIG. 1, wherein the outer frame is constructed of two pieces of stamped material, and the high voltage connection to the semiconductive grid is made by use of an electrode assembly, and without the ionizer.

The hardware cloth support grill 20 can, alternatively, be stamped from the same piece of material as the support frame assembly 88, as depicted by the numeral 130 in FIG. 5. Such construction would be less costly to manufacture than the use of separate component pieces for the hardware cloth support grill 20 and support frame assembly 88. The use of this construction technique would result in a support grill 20 having squared-off X-Y grid members, rather than rounded wire X-Y grid members, which are typically soldered together to make up standard hardware cloth. The squared-off X-Y grid members would operate in the same manner as would standard hardware cloth (round) X-Y grid members, and the overall operation of the electrostatic air cleaning apparatus would not be affected.

Each of the grid open spaces of semiconductive grid 40 and conductive grid 60 can be in the shape of a square for ease of manufacture. If a square shape is used, the size of each grid opening is preferably ½ inch in both length and width. If a grid pattern is used to form support grill 20, rather than using hardware cloth as discussed above, then the size of each grid opening also is preferably ½ inch in both length and width.

FIG. 5 illustrates an alternative second embodiment 100 of the electrostatic air cleaning apparatus which not only depicts the use of a new construction technique to build support frame 130, but also shows a variation of the embodiment of the high-voltage wire connected to the semiconductive support grid 40. These two new construction techniques result in the second embodiment 100 of the electrostatic air cleaner built in accordance to the principles of the present invention. Referring first to the outer support structure, the support frame consists of a larger piece 130 and a smaller, detachable piece 140. The larger piece of support frame 130 includes a bottom section 132, a top section 134, a side section 138, another side section 137, and a set of deformable tabs 136 on these sections. The detachable portion of the support frame 140 has slots 142 which receive tabs 136. Once the tabs 136 are engaged in the slots 142, tabs 136 may be twisted in order to retain the smaller piece of the support frame 140 to the larger piece 130. This method of assembly can be best viewed in FIG. 6.

A layer of insulative material 38 is located adjacent to the inner surface of all the support frame portions 132, 134, 137, and 138, so that leakage current between semiconductive layer 40 and the support frame assembly 130 is held to a minimum. The material used for insulative layer 38 is preferably DELRIN TM.

The second embodiment of the electrostatic air cleaner 100 is supplied with high-voltage electricity through a spark plug cap assembly 102. The incoming high-voltage electricity is supplied via wire 46, which is electrically connected into the spark plug cap 102. The spark plug cap 102 includes an outer layer of insulative material 104 and an electrical conductor 106 which is further connected to both wires 46 and a socket 108 made of electrically conductive material. The details of spark plug cap 102 are best viewed in FIG. 7.

Spark plug cap 102 is assembled onto an electrode assembly 110, as best viewed in FIG. 7. Electrode assembly 110 includes an insulative tube 112, which is preferably a hollow tube made of either DELRIN TM or PVC. Inside the insulative tube 112 is a thin rod 116, made of an electrical conductor, and a larger tip 114, which is also made of electrically conductive material. The larger tip 114 is constructed so as to mechanically and electrically engage the socket-shaped electrical conductor 108 of spark plug cap 102 when the spark plug cap 102 is assembled as a press fit to electrode 110.

Figure 6:
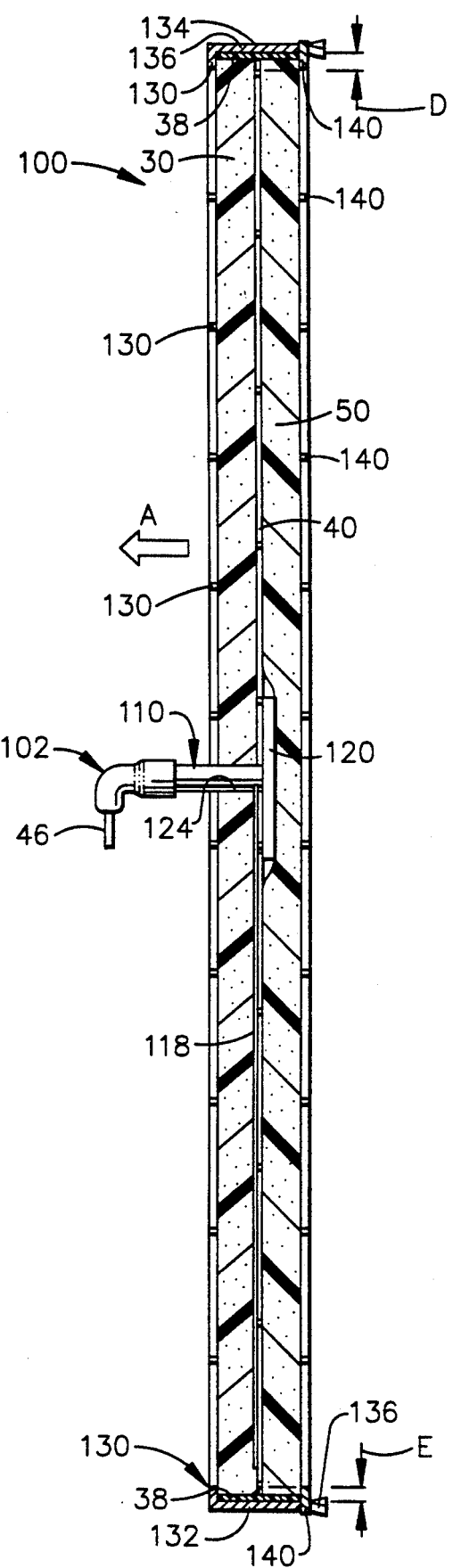
FIG. 6 is a cross-sectional side elevation view of the electrostatic air filter of FIG. 5.

Referring to FIGS. 5 and 6, the layers of various materials inside electrostatic air cleaner 100 are very similar to those used in the earlier embodiment described, electrostatic air cleaner 10. Electrostatic air cleaner 100 still includes a layer of outlet filter media material 30 (preferably made of reticulated polyether foam), a layer of semiconductive grid material 40, (preferably made of carbon-impregnated polycarbonate), and a layer of inlet filter media 50 (also preferably made of reticulated polyether foam). Because of electrode assembly 110, there are a few changes to the details in how these layers are constructed.

Electrode assembly 110 must fit through a hole 124 in outlet filter media 30. The insulative tube 112 of electrode assembly 110 is adhesively attached to a base 120 (see also FIG. 7), preferably made of either ceramic material or DELRIN ™. Base 120 is held in place between semiconductive grid 40 and inlet filter media layer 50. This can be best viewed in FIGS. 6 and 7. Insulative tube 112 has a small slot 122 in its wall, which is large enough for a flat strip 118 of semiconductive material to fit through the slot 122. Flat strip 118 is made of the same semiconductive material that makes up semiconductive grid 40. Flat strip 118 makes electrical contact with conductive thin rod 116 on one end and then runs along the semiconductive grid 40 while making surface contact with semiconductive grid 40.

Using the method of construction described above, high-voltage electricity can flow through wire 46, spark plug cap 102, electrode assembly 110, flat strip 118, and finally into semiconductive grid 40. With the typical high voltages used in the embodiments of the present invention, flat strip 118 can lie along semiconductive grid 40 and make sufficient contact with semiconductive grid 40 to allow current to flow without excessive losses due to leakage current.

Referring to FIG. 6, the second embodiment 100 is constructed in a similar manner to the first embodiment 10 from the standpoint that the semiconductive grid 40 is somewhat smaller in length and width than are the larger and smaller pieces of the support frame 130 and 140. A small air gap, depicted by the letters D and E on FIG. 6, separates semiconductive grid 40 from the top section 134 and the bottom section 132, respectively, of support frame 130. The insulative layer 38 is located within the above air gap surrounding semiconductive layer 40.

Figure 8:
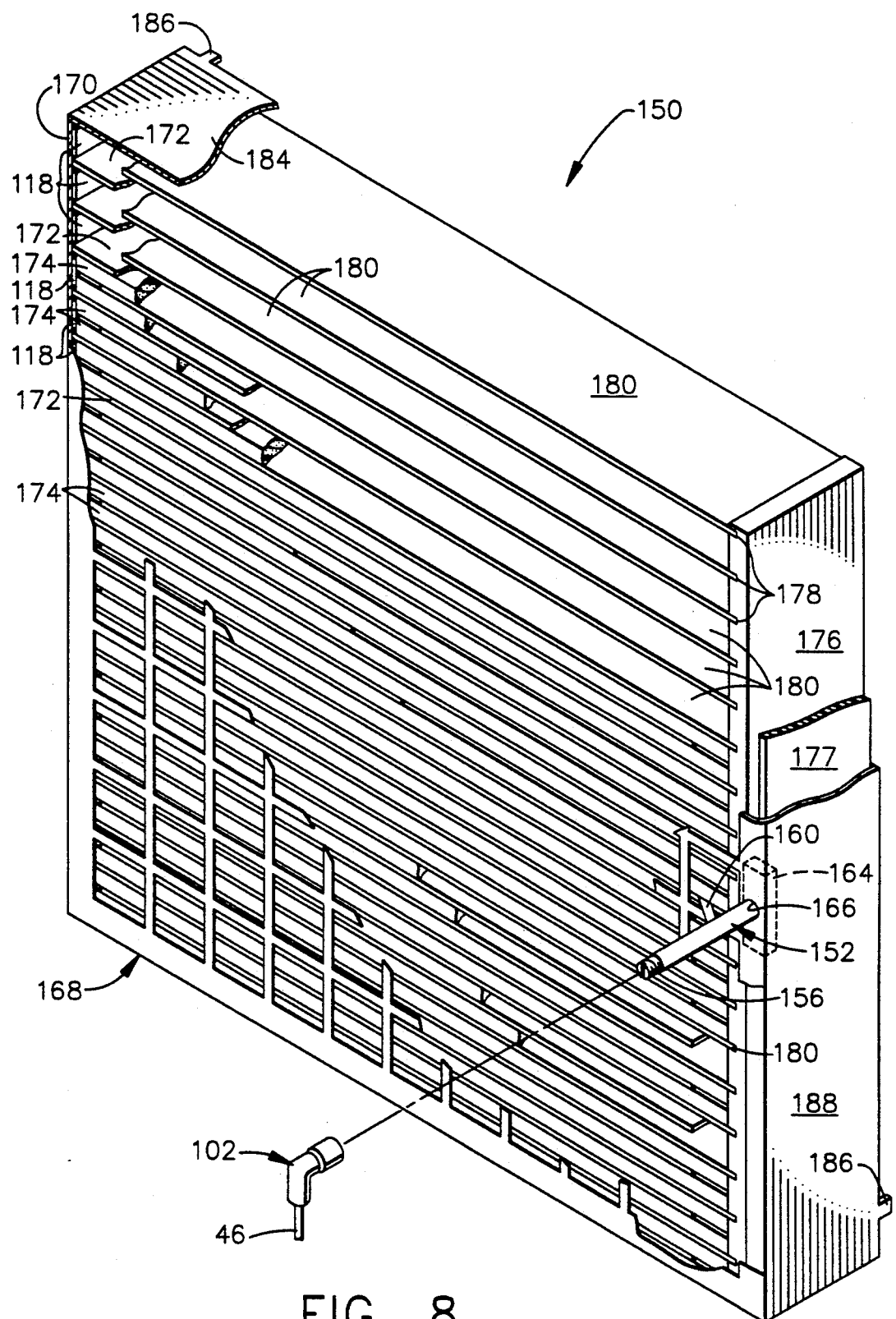
FIG. 8 is a fragmentary perspective view of an electrostatic air filter constructed in accordance with the principles of the present invention, wherein layers of conductive plates, reticulated foam, and semiconductive material are all arranged to be parallel to the flow of air through the air filter.

FIG. 8 depicts a third embodiment of an electrostatic air cleaner 150 having a plurality of parallel "sandwiches", each making up a separate electrostatic air filter. In this third embodiment 150, the direction of air flow is parallel to the grounded plates 172 and the high-voltage plates 180. This configuration is significantly different than the first two embodiments, designated by the numerals 10 and 100, in which the air flow was perpendicular to the grounded plates (or grids) 20 and 60, and perpendicular to the high-voltage semiconductive grid 40.

The outer frame of the third embodiment 150 is very similar to the support frame of the second embodiment 100, however, the side section 170 of support frame 168 is slotted so that the horizontal electrical conductors 172 can be attached easily to side section 170. The outer frame of the third embodiment 150 consists of a larger piece 168 and a smaller, detachable piece 169 (see FIG. 10). The larger piece 168 includes a bottom section 182, a top section 184, a side section 188, another side section 170, and a set of deformable tabs 186 on these sections. The detachable portion of the support frame 169 has several slots (not shown) which can receive tabs 186. Once the tabs 186 are engaged in the slots, tabs 186 may be twisted in order to retain the smaller piece of the support frame 169 to the larger piece 168.

In this instance, since the support frame 168 is normally fixed at ground potential, all of the other electrical conductors that are electrically connected to the frame system would also be connected at ground potential, including the horizontal electrical conductors 172. Another significant difference of third embodiment 150, as compared to second embodiment 100, is the location of the electrode assembly 152 (see FIGS. 8, 9 and 10). Electrode assembly 152 is mechanically attached to a portion of the side section 188 of support frame 168. As can be seen in FIG. 8, electrode assembly 152 fits through a hole 166 in the angled portion of the side section 188 of the support frame.

Figure 10:
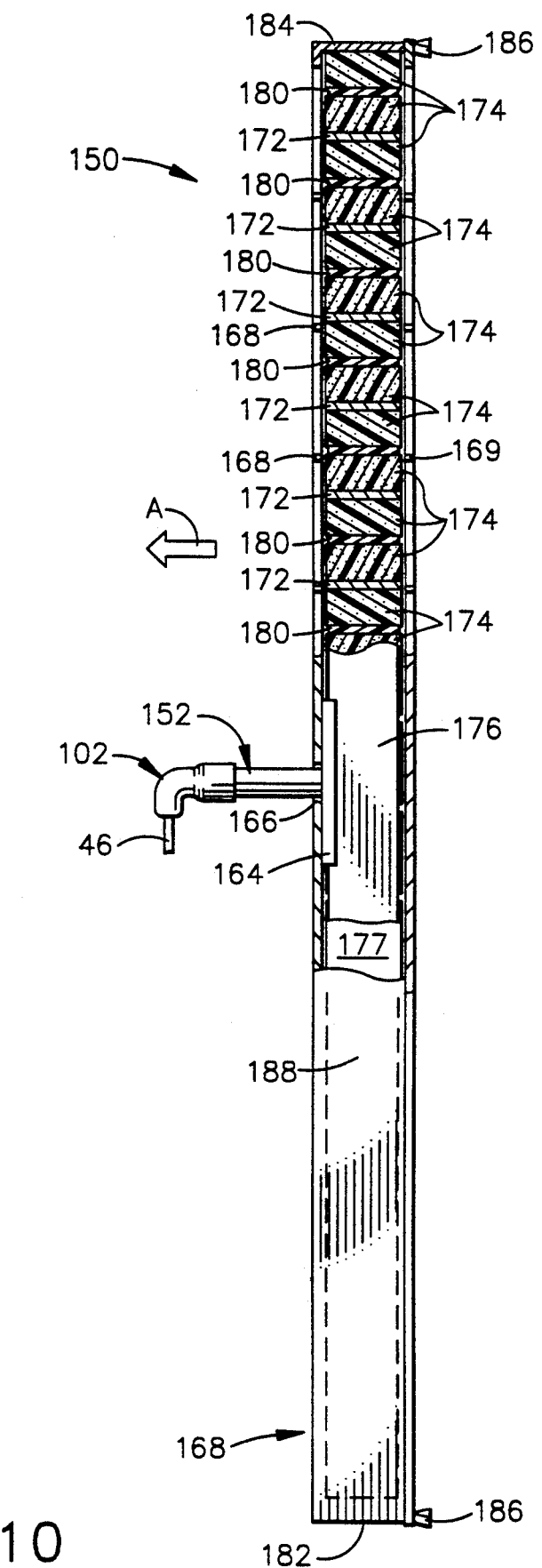
FIG. 10 is a side elevational view, partly in cross-section, of the electrostatic air filter of FIG. 8.

Parallel to the horizontal electrical conductors 172 are thin, rectangular sheets of semiconductive material 180, which are preferably made of carbon-impregnated polycarbonate. The electrically semiconductive sheets 180 must all be electrically connected to one common point so as to create the same high voltage field emanating from each portion of each of the horizontal semiconductive sheets 180. Accordingly, a vertical rectangular piece of semiconductive material 176 is located along the side portion 188 of the third embodiment 150, as seen in FIGS. 8 and 10. Vertical semiconductive piece 176 is somewhat thicker than the horizontal semiconductive sheets 180, and it has slots 178 in it to receive the horizontal semiconductive sheets 180. Once the horizontal semiconductive sheets 180 are placed into slots 178, the overall assembly can be bonded together by use of a solvent like MEK, which tends to melt the polycarbonate sheets 176 and 180 together to form a strong bond.

A layer of insulative material 177 is located adjacent to the inner surface of support frame portion 188, so that leakage current between semiconductive piece 176 and support frame assembly 168 is held to a minimum. Numerous layers of insulative material 181 are located adjacent to the inner surface of support frame portion 170, so that leakage current between semiconductive sheets 180 and support frame assembly 168 is held to a minimum. The material used for insulative piece 177 and insulative layers 181 is preferably DELRIN ™.

The horizontal electrical conductors 172 and the horizontal semiconductive sheets 180 tend to form parallel sandwich-type assemblies. Rectangular sheets of filter media 174 are placed between each horizontal electrical conductor 172 and horizontal semiconductive sheet 180 subassembly. Using this configuration, each rectangular section of filter media 174 (preferably made of reticulated polyether foam), has a high-voltage DC electric field passing through its elongated rectangular faces and body located between a horizontal semiconductive sheet 180 and a horizontal electrical conductor plate 172. As can be seen in FIG. 10, the third embodiment of the electrostatic air cleaner 150 comprises a set of multiple "sandwiches" each of which include an electrically conductive plate 172, a filter media portion 174, an electrical semiconductive sheet 180, and another filter media portion 174. An additional horizontal electrically conductive plate 172 is used as an end plate, and is placed adjacent to the final "sandwich" layer's filter media portion 174. This pattern can be used over and over as many times as desired until the desired size of the overall filter is achieved.

As can be seen best in FIG. 8, the horizontal electrical conductors 172 and the horizontal semiconductive sheets 180 are not of grid-type construction, but instead are solid pieces of material. By use of the horizontal "sandwiches" of the third embodiment 150, the construction of the air filter can be made more simple and less costly by not having to form a grid pattern out of the semiconductive material 180. Of course, the outer portions of the support frame 168 and 169 must still be made of a grid-type configuration, otherwise air flow could not pass through the filter assembly 150.

It is important to note that each horizontal semiconductive sheet 180 cannot be allowed to touch any of the grounded electrical conductors, including the support frame grid pieces 168 and 169, and including the side section 170 of support frame 168. It is also important to note that the slotted vertical semiconductive piece 176 also cannot be allowed to touch any of the grounded frame pieces, including the side section 188 of support frame 168. Keeping these constraints in mind, there must be a small amount of air gap clearance between all of the semiconductive pieces (which are fixed at a high DC voltage) and any of the grounded pieces of the electrostatic air cleaner 150. This is best achieved by having a small air gap similar to the air gaps designated by the letters D and E on FIG. 6.

It is also important to note that each horizontal electrical conductor plate 172 cannot be allowed to touch the high-voltage electrical semiconductive sheet 176. In view of this constraint, there must be a small amount of air gap clearance between all of the electrical conductor plates 172 (which are held at ground potential) and electrical semiconductive piece 176. This is best achieved by having a small air gap similar to the air gaps designated by the letters D and E on FIG. 6.

In the third embodiment of the electrostatic air cleaner 150, the electrode assembly 152 is attached to the right-angle portion of the side section 188 of support frame 168 (as described above). A spark plug cap 102 having an electric wire 46 is attached to electrode assembly 152, similar to that used in the second embodiment of the electrostatic air cleaner 100. FIGS. 9 and 11 show the details of the electrode assembly 152 and how it is attached into the electrostatic air cleaner 150.

Electrode assembly 152 includes an insulative tube 154, preferably made of either PVC or DELRIN ™. Insulative tube 154 has a side slot 162, which is large enough to allow a flat strip of semiconductive material 160 to pass through the slot 162. Inside its tube 154, electrode assembly 152 contains a thin rod 158 which is made of an electrically conductive material, and a larger tip 156 which also consists of an electrical conductor. A base 164 is attached to the support frame 168, and a hole 166 in support frame 168 allows the insulative tube 154 to protrude through the frame. The flat strip of semiconductive material 160 is arranged to run horizontally from a point inside the insulative tube 154, where it makes electrical connection with thin rod 158, to one of the horizontal semiconductive sheets 180, where it makes electrical connection to that horizontal semiconductive sheet 180. In this way, high-voltage electricity is passed from a DC power supply through electric wire 46, spark plug cap 102, electrode assembly 152, flat strip of semiconductive material 160, and into a horizontal semiconductive sheet 180. Since all of the horizontal semiconductive sheets 180 are electrically connected together by the slotted vertical semiconductive piece 176, each horizontal semiconductive sheet 180 is fixed at a high-voltage.

It will be understood that more than one electrostatic air cleaner 150 can be used in a single air duct to increase the overall capacity of air volume in cubic feet per minute that can be cleaned and filtered by the electrostatic air cleaners. FIG. 12 depicts an example of this arrangement wherein four separate electrostatic air cleaners 150 are arranged side-by-side, inside an outlet duct 196. This multi-filter assembly 190 is used so that the velocity of air, having an air flow in the direction depicted by the letter "A", through each of the electrostatic air cleaners 150 is greatly reduced as compared to the velocity of air coming through the inlet duct 192. A single ionizer 70 can be used in inlet duct 192, even though the velocity is high, without sacrificing any significant efficiency of particulate cleaning capability. After the air is sent through the ionizer 70, it is further directed into an expansion inlet duct 194, before it reaches the multiple set of electrostatic air cleaners 150. Multi-filter assembly 190 is, thus, much less expensive to build than four complete systems each having one ionizer 70 and one electrostatic air cleaner 150. This is a significant cost reduction, resulting in a significant commercial advantage to a supplier offering such a system.

Figure 13:
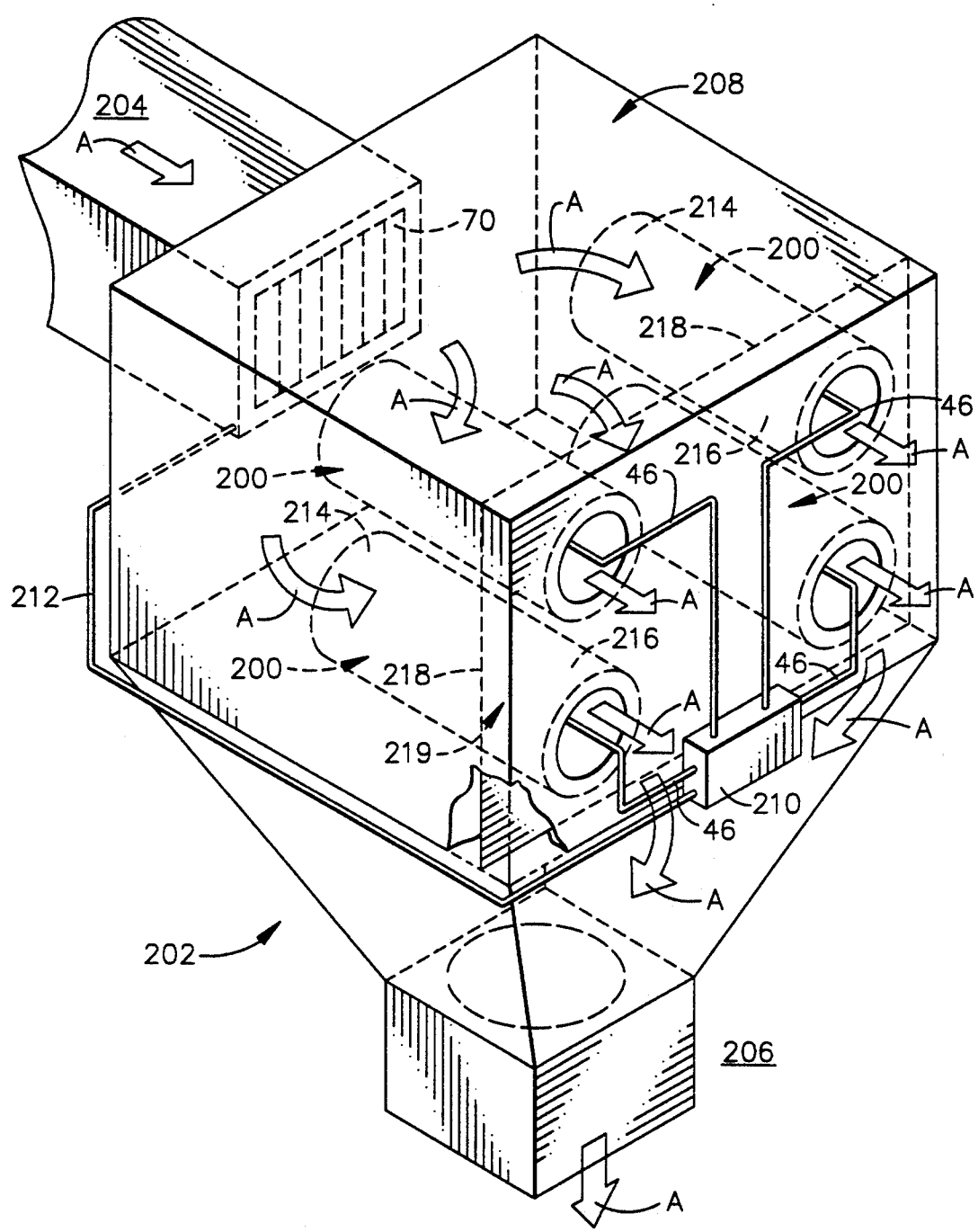
FIG. 13 is a fragmentary perspective view of an industrial dust collector which contains four cartridge electrostatic air filters constructed in accordance with the principles of the present invention, and which contains a common, single ionizer at the inlet of the dust collector.

A fourth embodiment of an electrostatic air cleaner 200 is depicted in FIG. 13. Electrostatic air cleaner 200 is cylindrical in shape, and is known as a "cartridge" filter, which can be used in a typical dust collector system 202. As can be seen in FIG. 13, dust collector system 202 can contain more than one electrostatic air cleaner 200. Present dust collector systems commonly have multiples of air filters, usually in pairs, such as 2, 4, 6 or 8 air filters.

In the dust collector system 202 of FIG. 13, a single inlet duct 204 is used to direct air through an ionizer 70. The air flow then enters a large chamber or manifold 208, and then is directed into the four cylindrical electrostatic air cleaners 200. The air flow is then directed out of the center of each of the electrostatic air cleaners 200, then through an outlet manifold 219 and into outlet duct 206. The general air flow directions are depicted by the large arrows "A".

A single DC high-voltage power supply 210 is used to provide electrical power for all four of the electrostatic air cleaners 200. A portion of high-voltage power supply 210 is also used to provide high-voltage electrical power for the ionizer 70. The voltage levels for the ionizer 70 and for the air cleaners 200 can be two different values and preferably are in the range of 6–20 kilovolts for ionizer 70 and in the range 12–45 kilovolts for each electrostatic air cleaner 200. Electrical wires 46 carry the high-voltage electricity from power supply 210 to each of the electrostatic air cleaners 200, and electrical wire 212 carries high-voltage electricity from power supply 210 to ionizer 70.

Figure 14:
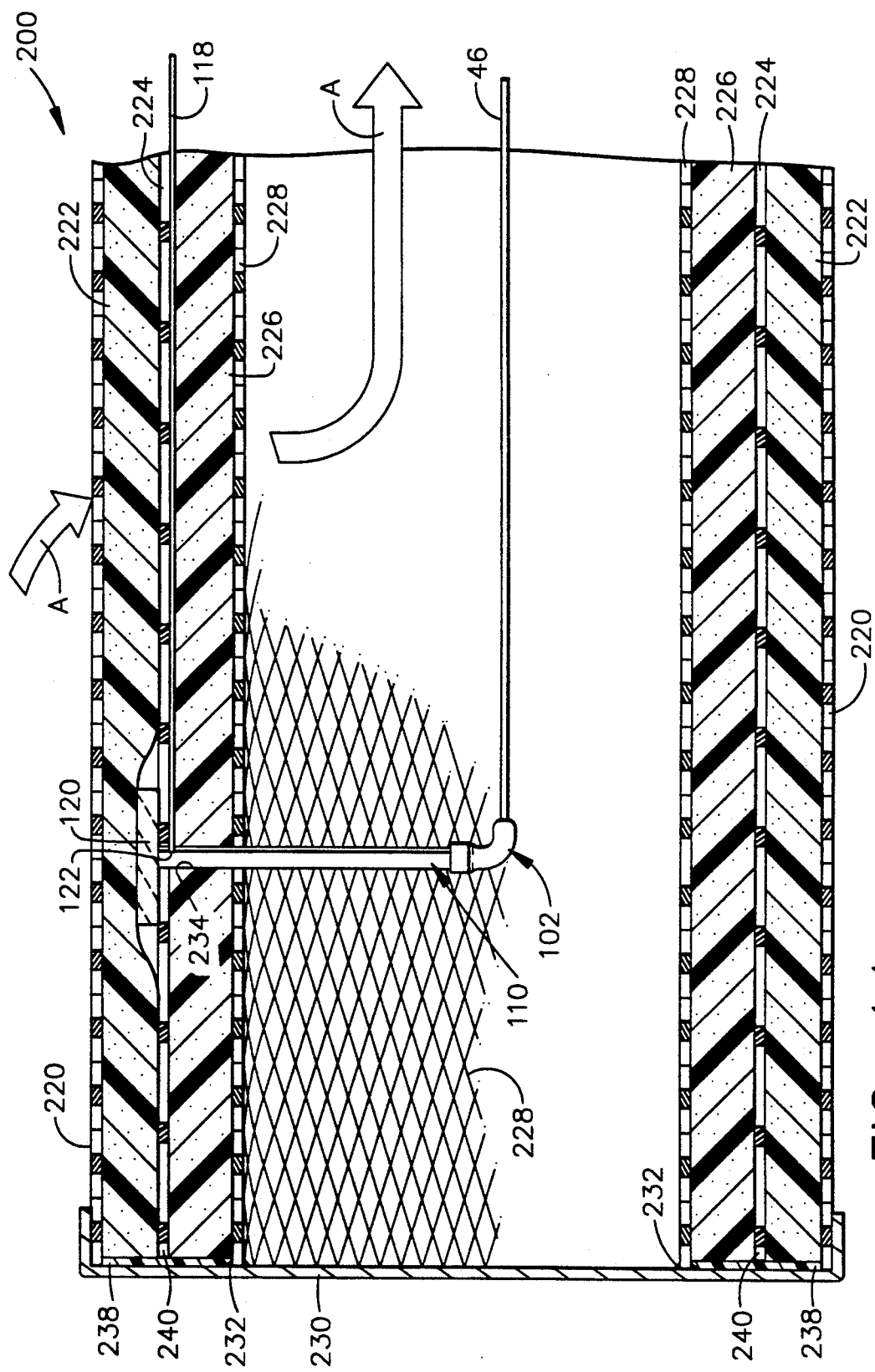
FIG. 14 is a fragmentary, cross-sectional side elevational view of the cartridge electrostatic air filter used in the industrial dust collector of FIG. 13.
Figure 15:
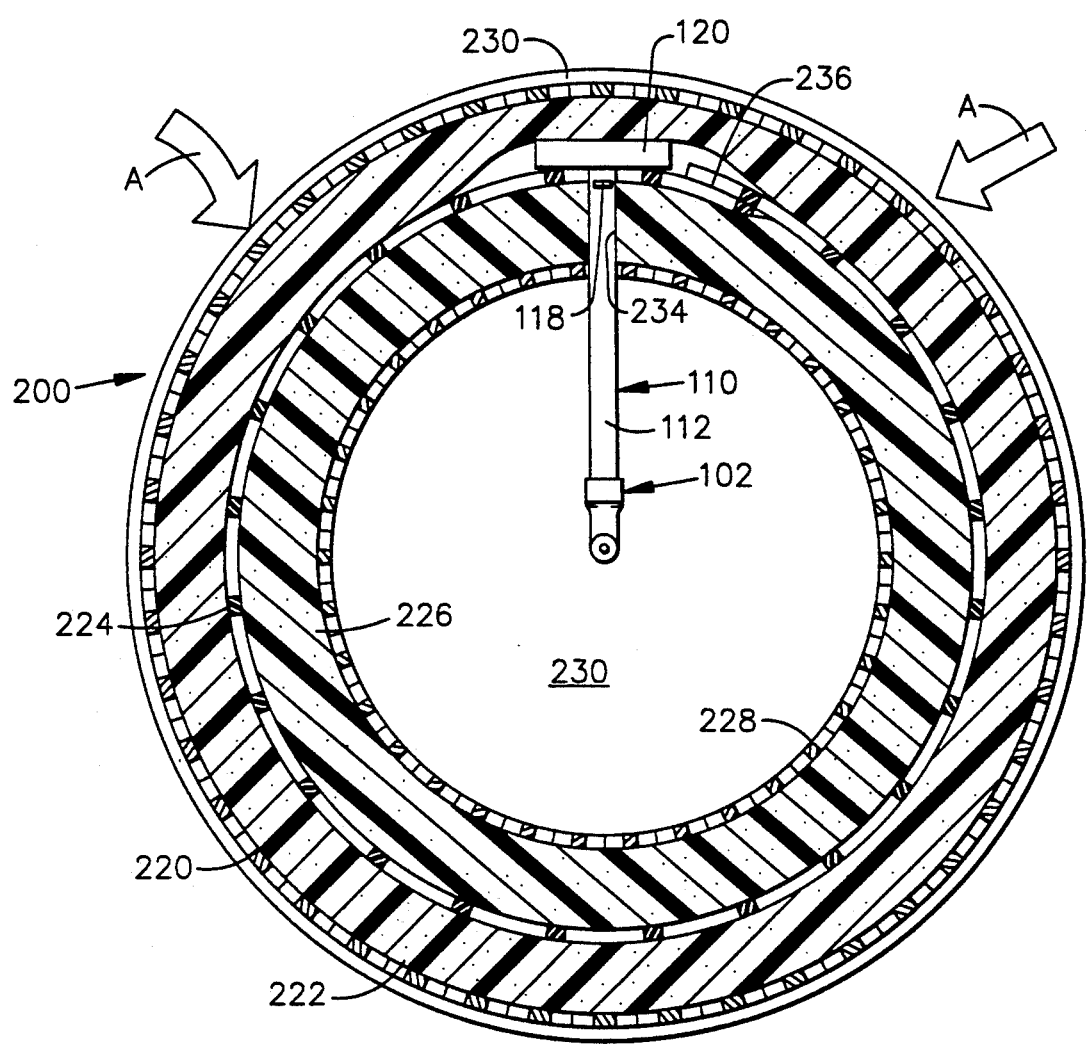
FIG. 15 is a transverse cross-sectional view of the cartridge electrostatic air filter used in the industrial dust collector of FIG. 13.

As can be seen in FIG. 13, each of the electrostatic air cleaners 200 has an overall cylindrical shape. The details of the construction of electrostatic air cleaners 200 is provided in FIGS. 14 and 15. As can be seen in FIG. 14, the outer layer 220 of electrostatic air cleaner 200 fits inside an end cap 230. The fit between the outer layer 220 and end cap 230 is tight enough so as to be air-tight under the pressures associated with a typical dust collector system 202, to prevent blow-by of dirty air into outlet duct 206. Outer layer 220 is made of a conductive material, preferably perforated metal or perforated conductive plastic. The perforations must be large enough to allow air flow to enter through the outer layer 220 without significant drop in air pressure. Outer layer 220 can, alternatively, consist of a fine mesh screen. As can be seen in FIG. 15, outer layer 220 has an overall cylindrical shape, and it is open on the noncapped end of the cylinder. It is preferred that the method of sealing the open end 216 of electrostatic air cleaner 200 against internal wall 218 be according to industrial standards for cartridge air filters.

A cylindrical layer of semiconductive material 224, preferably carbonimpregnated polycarbonate, is positioned in a space-apart relationship to outer layer 220. Semiconductive layer 224 consists of a semiconductive grid pattern, which is initially constructed as a sheet, and then rolled into a cylindrical shape having open ends. The seam in the sheet that makes up semiconductive layer 224 need not be perfectly abutted, but can have some overlap as shown in FIG. 15 at the location designated by the numeral 236. The seam 236 where the semiconductive layer 224 is joined together is adhesively fixed by the use of MEK solvent to melt together the two layers of the semiconductive material.

There must be a small clearance air gap 240 between the end of semiconductive layer 224 and end cap 230. This is to provide electrical isolation between the semiconductive layer 224, which is fixed at a high DC voltage during the operation of electrostatic air cleaner 200, and the end cap 230, which is fixed at ground potential. In addition to air gap 240, a layer of insulative material 238 is preferably located adjacent to the inner surface of end cap 230, so that leakage current between semiconductive layer 224 and the end cap 230 is held to a minimum. The shape of insulative layer 238 is circular, having a concentric circular piece cut out at its center. The material used for insulative layer 238 is preferably DELRIN ™.

A cylindrical inlet layer of filter media 222 is disposed between outer layer 220 and semiconductive layer 224. Inlet layer 222 is preferably made of reticulated polyether foam.

The innermost cylindrical layer 228 is made of conductive material, and can be made of hardware cloth, expanded metal, or a metal grid configuration. Inner layer 228 preferably is welded to end cap 230 at the locations designated by the numeral 232. Inner layer 228 must be strong enough to support the overall construction of electrostatic air cleaner 200 as well as maintaining such structure against the high pressure of the inlet air, flowing in the direction as depicted by the arrow "A", entering the filter assembly 200.

Disposed between inner layer 228 and semiconductive layer 224 is an outlet layer of filter media 226, preferably made of reticulated polyether foam. This outlet layer of filter media 226 is also formed into a cylindrical shape, and has a hole 234 in it to allow passage of an electrode 110.

Electrode assembly 110 is used in electrostatic air cleaner 200, and includes a base 120. Electrode assembly 110 is held in place by hole 234 and outlet layer of filter media 226, and the base 120 is firmly pressed against semiconductive layer 224 by the inlet layer of filter media 222. Electrical power is brought into the electrode assembly 110 by electric wire 46 and spark plug cap 102, which, when in operation, is attached to electrode assembly 110. The electricity is carried through the electrode assembly 110 and out a slot 122 in the wall of the insulative tube 112, by a flat strip 118, which is preferably made of carbon-impregnated polycarbonate. Flat strip 118 protrudes out of slot 122, and then continues along the semiconductive layer 224 thus making good electrical contact therewith. In this manner, high-voltage electrical power is brought into electrostatic air cleaner 200 along wire 46, spark plug cap 102, electrode assembly 110, flat strip 118, and finally into the semiconductive layer 224.

The electrical wires 46 are preferably connected to a positive polarity high-voltage DC source in the range of 12 to 45 kilovolts. It will be understood, however, that electrical wires 46 could be connected to a negative polarity high-voltage DC source (preferably in the range of −12 to −45 kilovolts), which is also preferably current-limited. With this configuration, a very high negative electric field gradient is produced across filter media 222 and 226 (which are maintained at ground potential on their opposite sides). Since the ionizer 70 has imparted a positive charge onto the moving air particulates, such particulates would tend to be directly attracted to the negatively charged filter media 222 and 226.

By use of the construction techniques and materials taught in the present invention, electrostatic air cleaner 200 has several advantages, including very high filtering efficiency of air particulates. This increased efficiency can be brought about in cartridge-type dust collector systems that are in use today, simply by replacing the cartridge filters of those dust collectors with the electrostatic air cleaner 200 and by adding a high-voltage power supply 210 to the system 202, as depicted in FIG. 13. As can be seen in FIGS. 14 and 15, the high-voltage electrical wiring is all kept within the "clean" environment of the outlet side of electrostatic air cleaner 200.

The air flow inside a typical dust collector system 202 is directed through an inlet duct 204 and into a large open chamber or manifold 208. The air flow, once inside chamber 208, tends to be mostly directed against a wall 218 (part of outlet manifold 219) before it passed through one of the cartridge filters 200. This causes a difference in air velocity across the outer layer in which the air velocity at the outer layer 230 near the closed end 214 of cartridge filter 200 (see FIGS. 13 and 16) is much less than the velocity at the outer layer 230 near the open end 216 of cartridge filter 200.

If the difference in air velocity near the two ends 214 and 216 is not compensated for, then the filter media layers 222 and 226 will not uniformly collect particulate matter across their surface areas, and the filter media layers near open end 216 will collect particulate matter much more quickly than they will near the closed end 214. In this circumstance, cartridge filter 200 would have to be cleaned more often to keep the filter media layers 222 and 226 operating effectively in areas near open end 216. Before such cleaning takes place, cartridge filter 200 may work at a lower than optimum efficiency.

One means of compensating for the air velocity distribution variations is to enlarge the overall diameter of cartridge filter 200 for a given capacity required by a particular installation. Since both the outer diameter and inner diameter would be enlarged, the outlet air velocity (at the inner diameter near open end 216) will proportionately decrease according to the square of the increase in the inner diameter. It has been observed that the problems in air velocity distribution variations are much less significant when using such a larger diameter cartridge. For example, if air velocity distribution variations cause problems when using the industrial standard 12¾ inch (outer diameter) cartridge, then the 20 inch (also a standard size) cartridge could be substituted in its place, to help alleviate the problems.

Figure 16:
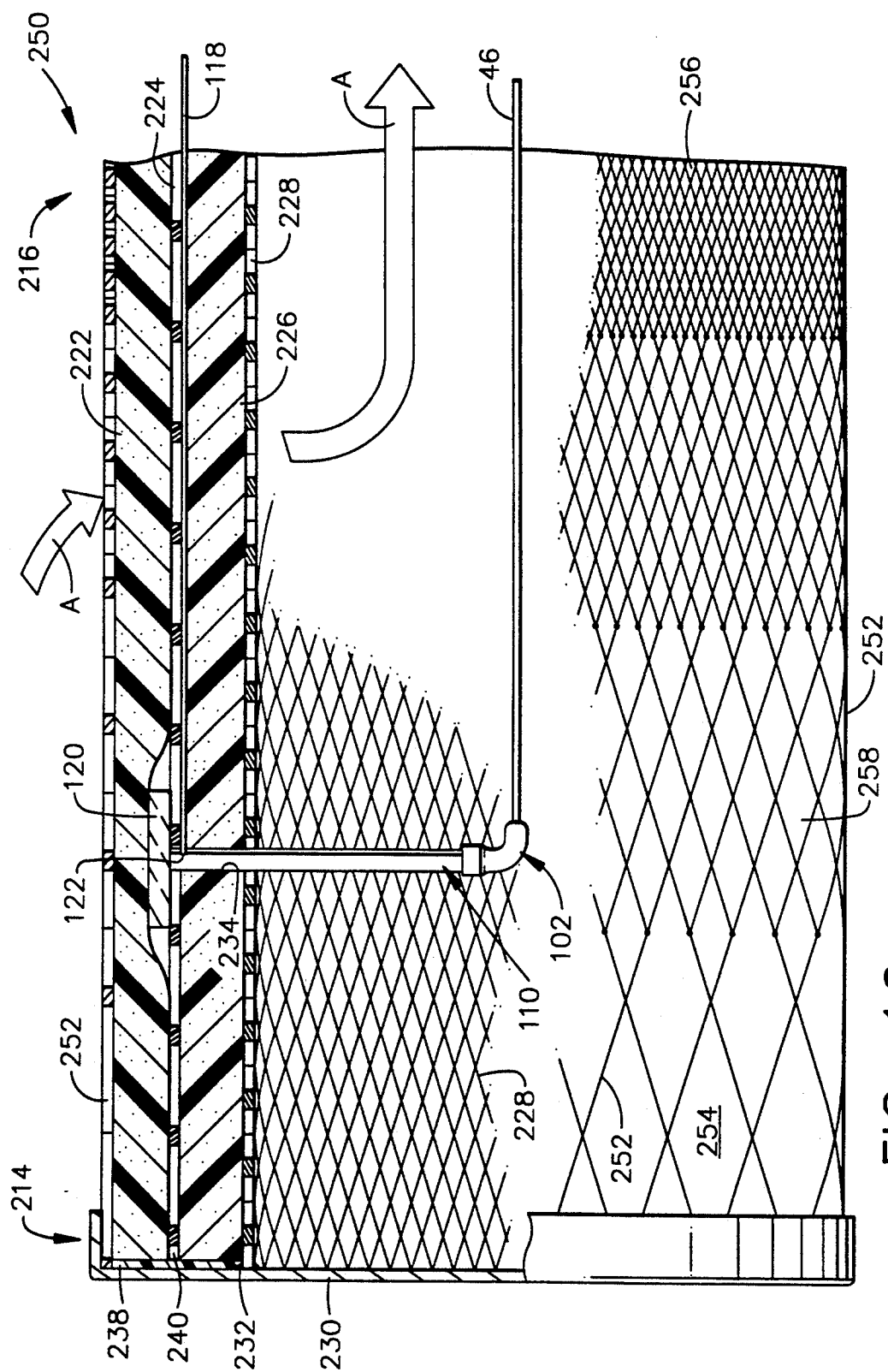
FIG. 16 is a fragmentary longitudinal cross-sectional view of the cartridge electrostatic air filter used in the industrial dust collector of FIG. 13, in which the outer layer of perforated metal has openings of varying sizes.

Another means of compensating for the air velocity distribution variations is to make it more difficult for the air flow to enter a cartridge filter near its open end 216 than at its closed end 214. This can be accomplished by utilizing an outer layer 252 which has much smaller perforations at the open end 216 than at the closed end 214. A preferred pattern of perforations in outer layer 252 is illustrated in FIG. 16. In FIG. 16, large perforations 254 are located near the closed end 214 of cartridge filter 250. The perforations become gradually smaller the closer the location to the open end 216, as illustrated by intermediate-sized perforations 258, and by the small perforations 256. Using this variable perforation size construction technique, the air flow is more evenly distributed across the surface area of filter media layers 222 and 226 due to the extra flow resistance of the smaller perforations 256 as compared to the larger perforations 254, thereby making more efficient use of cartridge filter 250.

Figure 17:
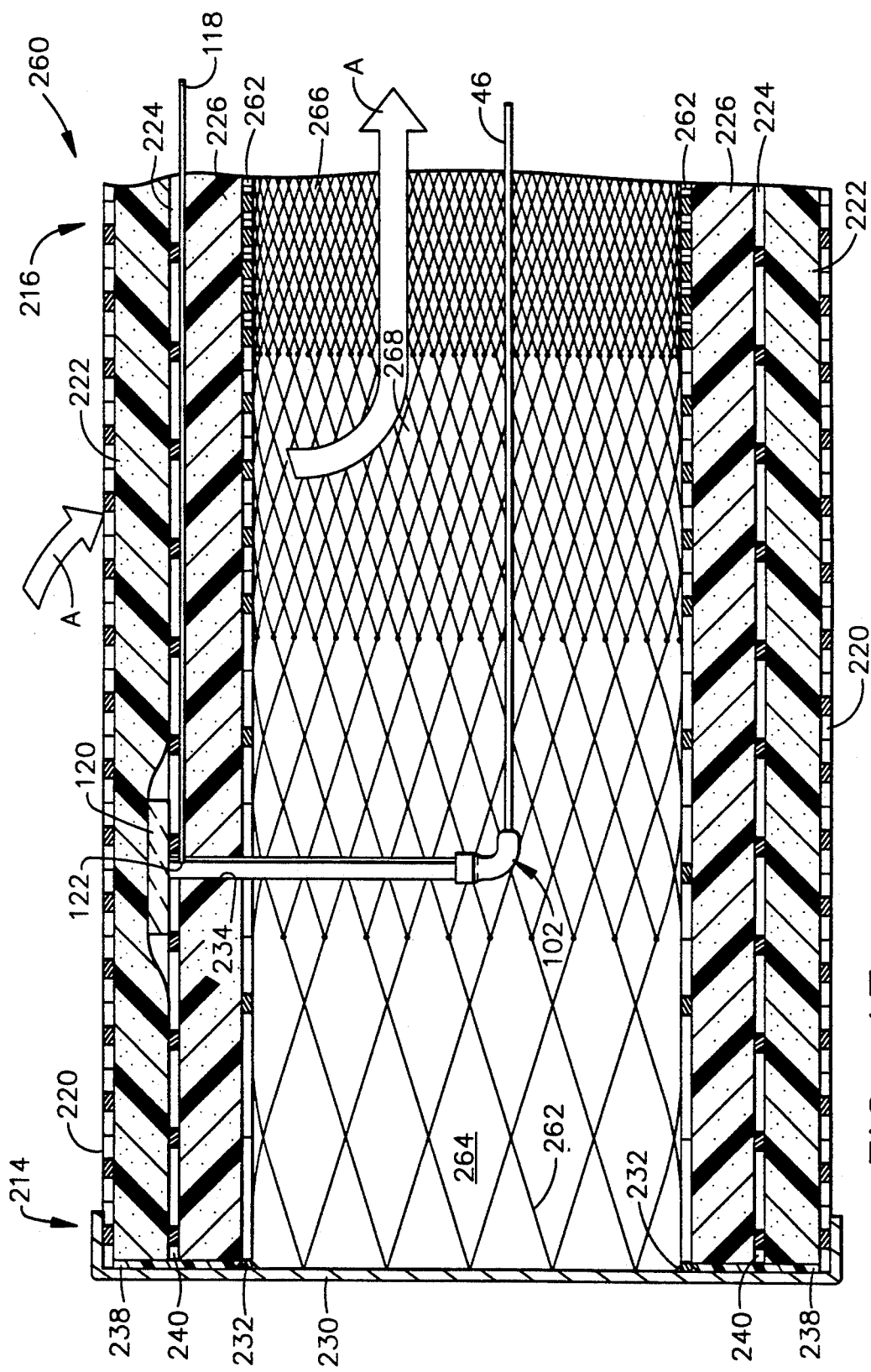
FIG. 17 is a fragmentary longitudinal cross-sectional view of the cartridge electrostatic air filter used in the industrial dust collector of FIG. 13, in which the inner layer of perforated metal has openings of varying sizes.
Figure 18:
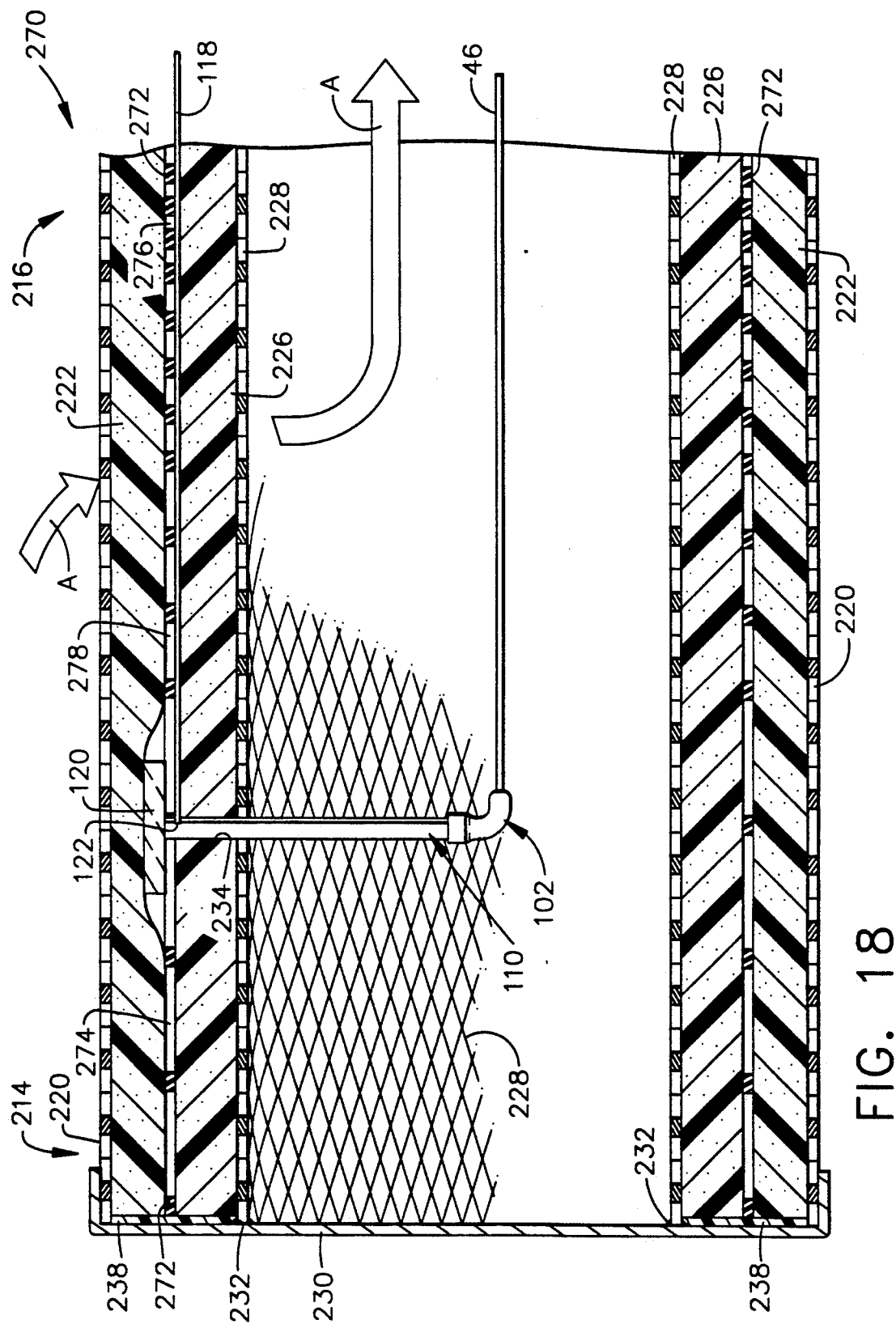
FIG. 18 is a fragmentary longitudinal cross-sectional view of the cartridge electrostatic air filter used in the industrial dust collector of FIG. 13, in which the semiconductive layer has openings of varying sizes.

In a similar fashion, a cartridge filter 260 could utilize an inner layer 262 which has varying perforation sizes to compensate for the air velocity variations between the cartridge filter's open end 216 and its closed end 214. A preferred pattern of perforations in inner layer 262 is illustrated in FIG. 17, which depicts large perforations 264 located near the closed end 214 of cartridge filter 260, and small perforations 266 near the open, "walled" end 216. The perforations become gradually smaller the closer the location to the open end 216, as illustrated by intermediate-sized perforations 268. Using this variable perforation size construction technique, the air flow is more evenly distributed across the surface area of filter media layers 222 and 226 due to the extra flow resistance of the smaller perforations 266 as compared to the larger perforations 264, thereby making more efficient use of cartridge filter 260.

Figure 19:
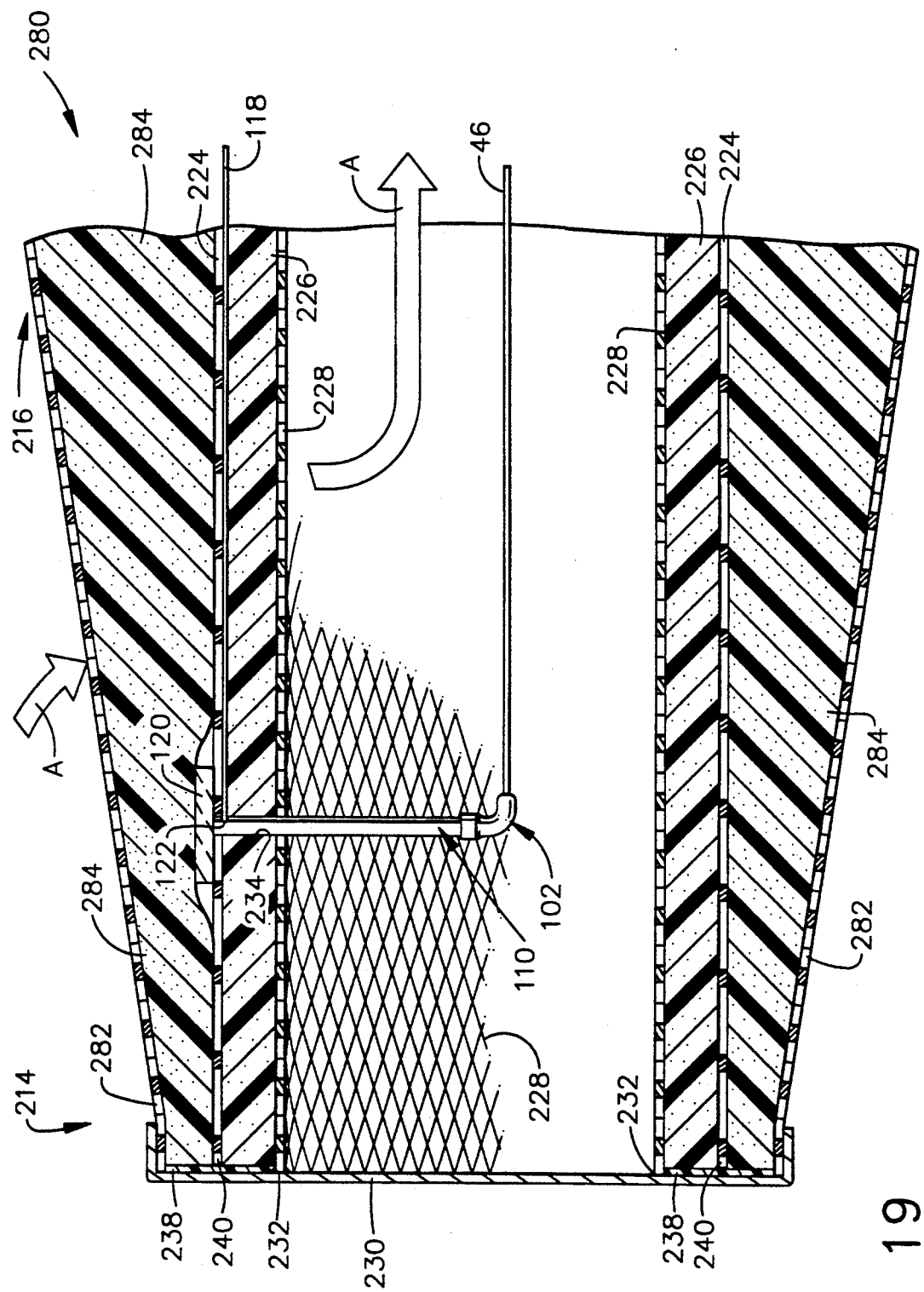
FIG. 19 is a fragmentary longitudinal cross-sectional view of the cartridge electrostatic air filter used in the industrial dust collector of FIG. 13, in which the inlet (outer) layer of filter media has a varying thickness.

Another approach to more evenly distributing air flow through filter media layers 222 and 226 is to increase the thickness of the filter media near the open end 216. An embodiment utilizing this approach includes a cartridge filter 280 having an inlet layer of filter media 284 exhibiting a varying thickness. Such a filter layer 284 is illustrated in FIG. 19, which depicts a larger thickness near the open end 216, and a smaller thickness near the closed end 214. The outer conductive layer 282 has an increasing diameter as it approaches open end 216. The air flow is more evenly distributed across the surface area of filter media layers 284 and 226 due to the extra flow resistance of the thicker area near the open, "walled" end 216. This more evenly distributed air flow allows for a more efficient use of cartridge filter 280. It will be understood that the outlet layer of filter media 226 could also have a varying thickness in lieu of, or in addition to, the thickness variations of inlet layer 284 depicted in FIG. 19.

The polyether foam which is used as the filter media in the inlet layer 222 and outlet layer 226 is very easily cleaned by use of vacuum cleaner. The polyether film is very rigid (for a foam) and lends itself well to having the particulates attached to its outer layer to be cleaned by a standard vacuum cleaner.

The electrostatic air cleaner 200 can also be cleaned by reversing the air flow through the system. Such blow-back systems are common in present industrial dust collector systems. The polyether foam layers of the present invention can also be cleaned by use of the vacuuming method discussed above.

The foregoing description of embodiments of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. An electrostatic air cleaner for use in removing particulate matter from moving air, said electrostatic air cleaner including an electrical connection to ground potential, said electrostatic air cleaner also including an electrical connection to at least one source of high voltage electrical power, said electrostatic air cleaner having an inlet end and an outlet end, said electrostatic air cleaner comprising:
    (a) an electrically conductive first air permeable support layer located near said outlet end of said electrostatic air cleaner, wherein said first air permeable support layer is electrically connected to ground potential;
    (b) an electrically non-conductive first layer of reticulated foam, said first layer of reticulated foam having a first side and a second side, said first side of the first layer of reticulated foam being adjacent to said first air permeable support layer;
    (c) an air permeable layer of semiconductive material comprising carbon-impregnated polycarbonate, said layer of semiconductive material having a first side and a second side, said first side of the semiconductive material being adjacent to said second side of the first layer of reticulated foam, wherein said layer of semiconductive material is electrically connected to a first source of high voltage electrical power;
    (d) an electrically non-conductive second layer of reticulated foam, said second layer of reticulated foam having a first side and a second side, said first side of the second layer of reticulated foam being adjacent to the second side of said layer of semiconductive material; and
    (e) an electrically conductive second air permeable support layer located near said inlet end of said electrostatic air cleaner and adjacent the second side of said second layer of reticulated foam, wherein said second air permeable support layer is electrically connected to ground potential.

2. An electrostatic air cleaner as recited in claim 1, further comprising an electrically conductive support frame assembly which is connected to said first air permeable support layer and said second air permeable support layer, and which surrounds the edge portions of said first layer of reticulated foam, said air permeable layer of semiconductive material, and said second layer of reticulated foam.

3. An electrostatic air cleaner as recited in claim 1, further comprising an electrically insulative support frame assembly which is connected to said first air permeable support layer and said second air permeable support layer, and which surrounds the edge portions of said first layer of reticulated foam, said air permeable layer of semiconductive material, and said second layer of reticulated foam.

4. An electrostatic air cleaner as recited in claim 1, wherein said first and second layers of reticulated foam comprise open cell polyether foam.

5. An electrostatic air cleaner as recited in claim 4, wherein said open cell polyether foam has a porosity of 20 to 90 pores per inch.

6. An electrostatic air cleaner as recited in claim 1, wherein said first air permeable support layer comprises hardware cloth.

7. An electrostatic air cleaner as recited in claim 1, wherein said first air permeable support layer comprises a fine mesh screen.

8. An electrostatic air cleaner as recited in claim 1, wherein said first air permeable support layer is in the shape of a grid pattern, said grid pattern having a high proportion of open area that will not substantially restrict the air flow as it passes through said first air permeable support layer.

9. An electrostatic air cleaner as recited in claim 1, wherein said layer of semiconductive material is in the shape of a grid pattern, said grid pattern having a high proportion of open area that will not substantially restrict the air flow as it passes through said layer of semiconductive material.

10. An electrostatic air cleaner as recited in claim 1, wherein said layer of semiconductive material has a volume resistivity in the range of $10^7$ to $10^{10}$ ohm-centimeters, inclusive.

11. An electrostatic air cleaner as recited in claim 1, wherein said second air permeable support layer is in the shape of a grid pattern, said grid pattern having a high proportion of open area that will not substantially restrict the air flow as it passes through said second air permeable support layer.

12. An electrostatic air cleaner as recited in claim 1, wherein said first air permeable support layer material comprises a material having a volume resistivity less than $10^5$ ohm-centimeters.

13. An electrostatic air cleaner as recited in claim 1, wherein said second air permeable support layer material comprises any material having a volume resistivity less than $10^5$ ohm-centimeters.

14. An electrostatic air cleaner as recited in claim 1, wherein said air permeable layer of semiconductive material is charged to a potential in the range of 12 to 45 kilovolts DC.

15. An electrostatic air cleaner as recited in claim 1, further comprising a support frame assembly which is held to ground potential, wherein said air permeable semiconductive layer having edge portions in close proximity to said support frame assembly, said air permeable semiconductive layer preventing arcing between said semiconductor layer and said support frame assembly.

16. An electrostatic air cleaner as recited in claim 15, further comprising insulative material located between the edge portions of said air permeable semiconductive layer and said support frame assembly.

17. An electrostatic air cleaner as recited in claim 1, wherein said electrical connection from the layer of semiconductive material to the first source of high voltage electrical power comprises a slide-on electrical connector having an insulating shroud.

18. An electrostatic air cleaner as recited in claim 1, wherein said electrical connection from the layer of semiconductive material to the first source of high voltage electrical power comprises an electrode assembly, said electrode assembly further comprising:

(a) a hollow tube of electrically insulative material, said hollow tube having open ends and a slotted opening in its side in close proximity to said layer of semiconductive material;

(b) a thin rod of electrically conductive material having two ends, having its longitudinal axis parallel to the longitudinal axis of said hollow tube, and positioned within the hollow space of said hollow tube;

(c) a strip of semiconductive material positioned to run through said slot opening in the side of said hollow tube, said strip of semiconductive material having a first end abutting said thin rod and a second end abutting said air permeable layer of semiconductive material;

(d) a tip made of electrically conductive material projecting out from one of the open ends of said hollow tube, said tip abutting one end of said thin rod;

(e) means for electrically connecting said thin rod to said strip of semiconductive material;

(f) means for electrically connecting said strip of semiconductive material to said air permeable layer of semiconductive material;

(g) means for electrically connecting said thin rod to said tip;

(h) a detachable cap sub-assembly, comprising:
  (i) a socket of electrically conductive material shaped so as to readily mate with said tip, and to remain mechanically connected to said tip after the mating has occurred; and
  (ii) an electrically insulative shroud which substantially surrounds said socket.

19. An electrostatic air cleaner as recited in claim 1, further comprising an ionizer located upstream the inlet of said electrostatic air cleaner, said ionizer comprising:

(a) a structure which can be placed in an air duct while allowing moving air to pass through; and (b) at least one electrode which can act as a corona voltage source, said at least one electrode being located so that it creates a path of ions across moving air that is passing through said structure, wherein said at least one electrode is electrically connected to a second source of high voltage electrical power.

20. An electrostatic air cleaner as recited in claim 19, wherein said electrically conductive support frame assembly and said first air permeable support layer are constructed from one piece of material.

21. An electrostatic air cleaner as recited in claim 19, wherein said the at least one electrode of said ionizer is charged to a potential in the range of 6 to 20 kilovolts DC.

22. An electrostatic air cleaner as recited in claim 19, said second source of high voltage electrical power having the same polarity as said first source of high voltage electrical power.

23. An electrostatic air cleaner as recited in claim 19, said second source of high voltage electrical power having the opposite polarity as said first source of high voltage electrical power.

24. An electrostatic air cleaner for use in removing particulate matter from moving air, said electrostatic air cleaner having an inlet end and an outlet end and including an electrical connection to ground potential, said electrostatic air cleaner also including an electrical connection to at least one source of high voltage electrical power, said electrostatic air cleaner comprising:
 (a) a plurality of air filter assemblies stacked up next to one another, each air filter assembly comprising:
  (i) an electrically conductive first strip layer having first and second planar faces, said first layer being electrically connected to ground potential;
  (ii) an initially substantially uncharged electrically non-conductive second strip layer of reticulated foam having first and second planar faces, said first face of the second layer being adjacent to said second face of said first layer;
  (iii) a third strip layer of semiconductive material having first and second planar faces, said first face of the third layer being adjacent to said second face of the second layer of reticulated foam, wherein said third layer of semiconductive material is electrically connected to a first source of high voltage electrical power;
  (iv) an initially substantially uncharged electrically non-conductive fourth strip layer of reticulated foam having first and second planar faces, said first face of the fourth layer being adjacent to said second face of the third layer;
 (b) an electrically conductive strip end layer having first and second planar faces, said end layer being adjacent to said second face of the fourth layer of the last one of the plurality of air filter assemblies, said end layer being electrically connected to ground potential; and
 (c) all of said planar faces of all of said strip layers being parallel to the direction of flow of said moving air, and the direction of the electric field set up by each said air filter assembly within said layers of reticulated foam is perpendicular to the direction of air flow of said moving air;
 (d) an electrically conductive support frame assembly which is electrically connected to the electrically conductive first layer of each of the air filter assemblies and to said electrically conductive end layer, and which partially surrounds the plurality of air filter assemblies stacked up next to one another and the electrically conductive end layer; and
 (e) a high voltage side section oriented within said support frame assembly, said high voltage side section being slotted for attachment of said third strip layers of semiconductive material of the stacked up plurality of air filter assemblies.

25. An electrostatic air cleaner as recited in claim 24, further comprising an ionizer located upstream of said inlet end of said electrostatic air cleaner, said ionizer comprising:
 (a) a structure which can be placed in an air duct while allowing moving air to pass through; and
 (b) at least one electrode comprising a corona voltage source, said at least one electrode being so located as to make physical contact with the moving air that is passing through said structure, said at least one electrode being electrically connected to a second source of high voltage electrical power.

26. An electrostatic air cleaner as recited in claim 24, wherein said second and fourth layers of reticulated foam of each of the air filter assemblies comprise open cell polyether foam.

27. An electrostatic air cleaner as recited in claim 24, wherein said third layer of semiconductive material of each of the air filter assemblies comprises carbon-impregnated polycarbonate.

28. An electrostatic air cleaner as recited in claim 24, further comprising a support frame assembly which is held to ground potential, wherein said third layers of semiconductive material of said air filter assemblies, which are electrically connected to a source of high voltage, are in close proximity to said support frame assembly, said semiconductive layers comprising a material which will prevent arcing between said semiconductor layers and said support frame assembly.

29. A cylindrical cartridge electrostatic air cleaner for use in removing particulate matter from moving air, said cartridge electrostatic air cleaner including an electrical connection to ground potential, said cartridge electrostatic air cleaner also including an electrical connection to at least one source of high voltage electrical power, said cartridge electrostatic air cleaner comprising:
 (a) an electrically conductive inner air permeable support layer, said inner support layer being cylindrical and having open ends, said inner air permeable support layer being electrically connected to ground potential;
 (b) an electrically non-conductive first cylindrical layer of reticulated foam with open ends, said first layer of reticulated foam having an inner face and an outer face, said inner face being adjacent to said inner air permeable support layer;
 (c) an air permeable cylindrical layer of semiconductive material with open ends, said layer of semiconductive material having an inner face and an outer face, said inner face of the semiconductive material being adjacent to said outer face of said first layer of reticulated foam, said layer of semiconductive material being electrically connected to a first source of high voltage electrical power;
 (d) an electrically non-conductive second cylindrical layer of reticulated foam with open ends, said second layer of reticulated foam having an inner face and an outer face, said inner face of the second layer of reticulated foam being adjacent to the outer face of said layer of semiconductive material;
 (e) an electrically conductive outer cylindrical air permeable support layer with open ends, said outer support layer being adjacent the outer face of said second layer of reticulated foam, said outer air permeable support layer being electrically connected to ground potential;
 (f) a circular end cap having a rim which has an inner diameter substantially equal to the outer diameter of said outer air permeable support layer at one of its open ends so as to form a substantially air-tight closure for said last mentioned open end of said outer air permeable support layer, and wherein said end cap is affixed to said inner air permeable support layer at one of said open ends thereof;
 (g) said outer support layer defining the inlet of said cartridge electrostatic air cleaner, and said open end of said inner support layer defining the outlet of said cartridge electrostatic air cleaner;
 (h) said electrical connection from the layer of semiconductive material to the first source of high voltage electrical power comprising an electrode assembly, said electrode assembly further comprising:
  (i) a hollow tube of electrically insulative material, said hollow tube having open ends and a slot opening in its side;

(ii) a thin rod of electrically conductive material having two ends, having its longitudinal axis parallel to the longitudinal axis of said hollow tube, and positioned within the hollow space of said hollow tube;

(iii) a strip of semiconductive material positioned to run through said slot opening in the side of said hollow tube, said strip of semiconductive material having a first end abutting said thin rod and a second end abutting said air permeable layer of semiconductive material;

(iv) a tip made of electrically conductive material projecting out from one of the open ends of said hollow tube, said tip abutting one end of said thin rod;

(v) means for electrically connecting said thin rod to said strip of semiconductive material;

(vi) means for electrically connecting said strip of semiconductive material to said air permeable layer of semiconductive material;

(vii) means for electrically connecting said thin rod to said tip; and (viii) a detachable cap sub-assembly, comprising:
(A) a socket of electrically conductive material shaped so as to readily mate with said tip, and to remain mechanically connected to said tip after the mating has occurred; and
(B) an electrically insulative shroud which substantially surrounds said socket.

30. A method of cleaning particulate matter from air, comprising the steps of:
(a) directing moving air through an ionizer, said ionizer including at least one electrode which is charged at a high DC voltage potential and which comprises a corona voltage source, said ionizer imparting an electrical charge upon a large majority of said particulate matter within the moving air; and
(b) thereafter, directing said moving air through an air filter, whereby said charged particulate matter is removed from the moving air by at least one layer of open cell reticulated foam, said at least one layer of open cell reticulated foam having a first side and a second side, wherein said at least one layer of open cell reticulated foam is charged to a high DC voltage on its first side by an air permeable layer of semiconductive material comprising carbon-impregnated polycarbonate, said semiconductive material being electrically connected to a source of high voltage electrical power, and wherein said at least one layer of open cell reticulated foam is held to ground potential on its second side by a conductive layer of air permeable material, thereby creating a high voltage electric field through said at least one layer of open cell reticulated foam, and wherein said at least one layer of open cell reticulated foam is non-deliquescent so that the high voltage electric field produced through the at least one layer of open cell reticulated foam is not dissipated by a buildup of water vapor.

31. A method of cleaning particulate matter from air as recited in claim 30, wherein said ionizer is charged to a DC voltage in the range of 6 to 20 kilovolts.

32. A method of cleaning particulate matter from air as recited in claim 30, wherein the first side of said at least one layer of reticulated foam is charged to a DC voltage in the range of 12 to 45 kilovolts.

33. A method of cleaning particulate matter from air as recited in claim 30, wherein said at least one layer of reticulated foam comprises open cell polyether foam.

34. A method of cleaning particulate matter from air as recited in claim 33, wherein said open cell polyether foam has a porosity of 20 to 90 pores per inch.

35. A method of cleaning particulate matter from air as recited in claim 30, further comprising a support frame assembly which is held to ground potential, and locating the layer of semiconductive material in close proximity to said support frame assembly, said semiconductive layer precluding arcing between said support frame assembly and said semiconductive layer.

36. A method of cleaning particulate matter from air as recited in claim 35, wherein said layer of semiconductive material has a volume resistivity in the range of $10^7$ to $10^{10}$ ohm-centimeters, inclusive.

37. A method of cleaning particulate matter from air as recited in claim 30, including the step of initiating said method with said air filter free of any pre-coating of particulate material, and achieving its nominal efficiency at the outset.

38. A method of cleaning particulate matter from air, comprising the steps of:
(a) directing moving air through an ionizer, said ionizer including at least one electrode which is charged at a high DC voltage potential and which comprises a corona voltage source, said ionizer imparting an electrical charge upon a large majority of said particulate matter within the moving air; and
(b) thereafter, directing said moving air through an air filter while the moving air is undergoing the following process steps:
(i) removing said charged particulate matter from the moving air by a first layer of reticulated foam, said first layer of reticulated foam having a first side and a second side, wherein said first layer of reticulated foam is held to ground potential at its first side by a conductive layer of air permeable material, and wherein said first layer of reticulated foam is charged to a high DC voltage at its second side by an air permeable layer of semiconductive material comprising carbon-impregnated polycarbonate, said semiconductive material being electrically connected to a source of high voltage electrical power, thereby creating a high voltage electric field through the first layer of reticulated foam, and wherein said first layer of reticulated foam is non-deliquescent so that the high voltage electric field produced through the first layer of reticulated foam is not dissipated by a buildup of water vapor; and
(ii) removing further charged particulate matter from the moving air by a second layer of reticulated foam, said second layer of reticulated foam having a first side and a second side, wherein said second layer of reticulated foam is charged to a high DC voltage at its first side by said air permeable layer of semiconductive material, and wherein said second layer of reticulated foam is held to ground potential at its second side by a conductive layer of air permeable material thereby creating a high voltage electric field through the second layer of reticulated foam, and wherein said second layer of reticulated foam is non-deliquescent so that the high voltage electric field produced through the second layer of reticulated foam is not dissipated by a buildup of water vapor.

39. A method of cleaning particulate matter from air, comprising the step of directing said moving air through an air filter, whereby particulate matter is removed from the moving air by at least one layer of open cell reticulated foam, said at least one layer of open cell reticulated foam having a first side and a second side, wherein said at least one layer of open cell reticulated foam is charged to a high DC voltage on its first side by an air permeable layer of semiconductive material comprising carbon-impregnated polycarbonate, said semiconductive material being electrically connected to a source of high voltage electrical power, and wherein said at least one layer of open cell reticulated foam is held to ground potential on its second side by an air permeable layer of conductive material which is electrically connected to a source of high voltage electrical power, thereby creating a high voltage electric field through said at least one layer of open cell reticulated foam, and wherein said at least one layer of open cell reticulated foam is non-deliquescent so that the high voltage electric field produced through the at least one layer of open cell reticulated foam is not dissipated by a buildup of water vapor.

* * * * *